US005896417A

United States Patent [19]
Lau

[11] Patent Number: 5,896,417
[45] Date of Patent: Apr. 20, 1999

[54] APPARATUS UTILIZING CURRENT-TO-VOLTAGE CONVERSION FOR TRANSMITTING DATA AT DIFFERENT DATA TRANSFER RATES ESPECIALLY IN APPLICATIONS SUCH AS DUAL-RATE ETHERNET LOCAL-AREA NETWORKS

[75] Inventor: Hung-Wah Anthony Lau, Los Altos, Calif.

[73] Assignee: National Semiconductor Corporation, Santa Clara, Calif.

[21] Appl. No.: 08/738,149

[22] Filed: Oct. 25, 1996

[51] Int. Cl.$^6$ ............................................. H04B 3/00
[52] U.S. Cl. .................. 375/258; 375/377; 370/463;
370/466; 370/538; 333/124; 333/32; 359/115
[58] Field of Search ....................... 375/219, 220,
375/257, 258, 295, 316, 377; 333/24 R,
32, 124; 370/463, 464, 466, 538; 359/109,
115

[56] References Cited

U.S. PATENT DOCUMENTS

| | | |
|---|---|---|
| 3,936,602 | 2/1976 | Korver . |
| 4,764,922 | 8/1988 | Dieter et al. . |
| 4,896,349 | 1/1990 | Kubo et al. . |
| 5,249,183 | 9/1993 | Wong et al. . |
| 5,253,249 | 10/1993 | Fitzgerald et al. . |
| 5,260,664 | 11/1993 | Graham . |
| 5,336,946 | 8/1994 | Segaram et al. . |
| 5,357,145 | 10/1994 | Segaram . |
| 5,410,188 | 4/1995 | Segaram . |
| 5,444,410 | 8/1995 | Polhemus . |
| 5,541,957 | 7/1996 | Lau . |
| 5,715,287 | 2/1998 | Wadhawan et al. ........... 375/257 |

FOREIGN PATENT DOCUMENTS

| | | |
|---|---|---|
| 0567342 | 10/1993 | European Pat. Off. . |
| 0596648 | 5/1994 | European Pat. Off. . |
| 0596523 | 5/1994 | European Pat. Off. . |

OTHER PUBLICATIONS

Bryan, "Pumping up Ethernet," *Byte*, vol. 18, No. 9, Aug. 1993, pp. 121–126.

Leonard, "FDDI Rides Twisted Pair To The Desktop," *Electronic Design*, Sep. 16, 1993, pp. 85, 86, and 88.

Rosenblatt, "Data Communications," *IEEE Spectrum*, Jan. 1991, pp. 48–51.

Shih et al, "10Mb/s Twisted Pair CMOS Transceiver With Transmit Waveform Pre-equalization," *Procs. IEEE 1991 Cust. Integ. Circs. Conf.*, May 12–15, 1991, pp. 7.3.1–7.3.4.

"Application Notes for the FDDI–TP Interface Modules," application note, bel, Jul. 1993, 1 p.

"10Base-T Dual Isolation and Filter Module," data sheet, Pulse Engineering, Inc., May 1992, 2 pp.

(List continued on next page.)

*Primary Examiner*—Amanda T. Le
*Attorney, Agent, or Firm*—Skjerven, Morrill, MacPherson, Franklin and Friel LLP; Ronald J. Meetin

[57] ABSTRACT

An electronic apparatus capable of transmitting data at two or more different data rates contains transmitter circuitry, a cable connection mechanism, and an isolation transformer having a primary winding and a secondary winding. The transmitter circuitry low-pass filters digital data which the transmitter circuitry transmits to the primary winding at a first data rate. The transmitter circuitry also transmits digital data to the primary winding at a second data rate different from, typically greater than, the first data rate. The cable connection mechanism provides outgoing data from the secondary winding to the communication cable. Importantly, the transmitter circuitry is operable to generate current-sourced data signals at both data rates and then to convert the current-sourced signals into impedance-produced voltage signals that constitute the outgoing data. Current-source amplifier circuitry normally generates the current-sourced signals. Impedance circuitry then converts the current-sourced signals into the outgoing data.

44 Claims, 12 Drawing Sheets

TRANSMIT PATH VARIATION

OTHER PUBLICATIONS

"DP83223 TWISTER Twisted Pair FDDI Transceiver Device," preliminary data sheet, National Semiconductor, Jul. 1993, pp. 1–10.

"DP83840 10/100 Mb/s Ethernet Physical Layer," preliminary data sheet, National Semiconductor, Sep. 1995, pp. 1–56.

"Electromagnetic compatability for industrial–process measurement and control equipment, Part 3: Radiated electromagnetic field requirements" International Standard, CEI/IEC 801–3, Third Impression, 1992, pp. 1–41 and 2 further pp.

"Fast Cats™ Cougar Series 10/100 Base–TX and ATM Transformer Modules," PT4171/PT4171S/ST6118, PT4172, and ST6114 data sheet, Valor Electronics, 1995, 4 pp.

"FDDI–TP Interface Module," data sheet, bel, Jul. 1993, 2 pp.

"IEEE Link Task Force Autodetect, Specification for NWay Autodetect," Version 1.0, Apr. 10, 1994, pp. 1–59 and 7 further pp.

*Local Area Network Databook*, National Semiconductor, 1992, pp. vii–viii, 1–3 –1–23, 1–359, 2–34 –2–62, 4–7, and 5–7.

"Low Profile Surface Mount 10Base–T Interface Module," data sheet, Pulse Engineering, Inc., Mar. 1993, 4 pp.

"MAC Parameters, Physical Layer, Medium Attachment Units and Repeater for 100 Mb/s Operation (version 1.0)," Carrier Sense Multiple Access with Collision Detection (CSMA/CD) Access Method and Physical Layer Specifications, Draft Supp. to 1993 version of ANSI/IEEE Doc. 807.3u/d2 Std 802.3, Jul. 24, 1994, pp. i–xviii and 21–1 –30–85 and 6 further pp.

"Media Access Control (MAC) Parameters, Physical Layer, Medium Attachment Units, and Repeater for 100 Mb/s Operation, Type 100Base–T (Clauses 21–30)," IEEE Standards for Local and Metropolitan Area Networks: Supplement to Carrier Sense Multiple Access with Collision Detection (CSMA/CD) Access Method and Physical Layer Specifications, IEEE Std 802.3u–1995, Oct. 26, 1995, pp. i–xiii and 1–413 and 9 further pp.

"Physical Layer for 100Mb/s Operation (100Base–X)," Carrier Sense Multiple Access with Collision Detection (CSMA/CD) Access Method & Physical Layer Specifications, Draft Supp. to ANSI/IEEE Std. 802.3, 1993 Edition, 1994, pp. 1–41.

"Radio Frequency Devices," 47 CFR Ch. 1, Part 15, Oct. 1993, pp. 536–583.

"System Considerations for Multisegement 10 Mb/s Baseband Networks (Section 13), Twisted–Pair Medium Attachment Unit (MAU) and Baseband Medium, Type 10BASE–T (Section 14)," IEEE Standards for Local and Metropolitan Area Networks: Supplement to Carrier Sense Multiple Access with Collision Detection (CSMA/CD) Access Method and Physical Layer Specifications, IEEE Std. 802.3i–1990, Mar. 8, 1991, 55 pp.

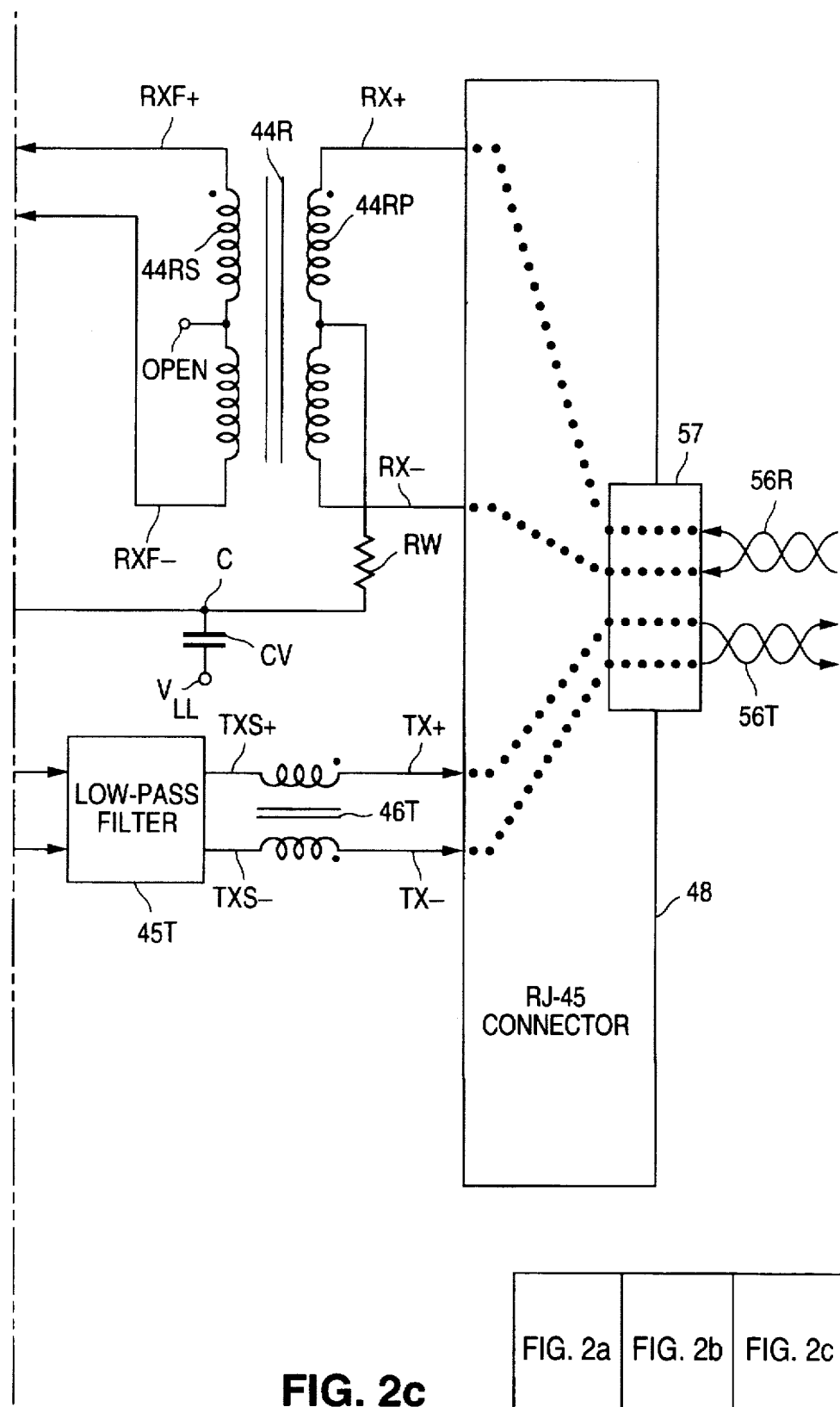
FIG. 2c
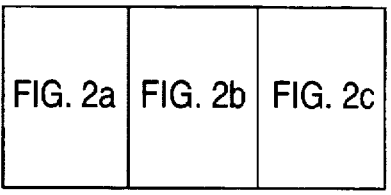
KEY TO FIG. 2

TRANSMIT PATH

RECEIVE PATH

TRANSMIT PATH VARIATION

TRANSMIT PATH VARIATION

APPARATUS UTILIZING CURRENT-TO-VOLTAGE CONVERSION FOR TRANSMITTING DATA AT DIFFERENT DATA TRANSFER RATES ESPECIALLY IN APPLICATIONS SUCH AS DUAL-RATE ETHERNET LOCAL-AREA NETWORKS

FIELD OF USE

This invention relates to devices for transmitting data to, and receiving data from, communication cables. In particular, this invention relates to apparatus suitable for transferring digital data through local-area networks at multiple data transfer rates.

BACKGROUND ART

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation. Information processing equipment made by different suppliers can thus be readily incorporated into the LAN.

The ISO Open Systems Interconnection Basic Reference Model defines a seven-layer model for data communication in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates a typical example of how a conventional 10Base-T media-access unit ("MAU") interfaces with an outgoing twisted-pair copper cable 10T and an incoming twisted-pair copper cable 10R. The 10Base-T MAU in FIG. 1 is part of a personal computer, a work station, a file server, a bridge, a repeater, or DTE. The MAU consists of an interface controller 12, a 10Base-T transceiver 14, two sets of terminating resistors 16T and 16R, two low-pass filters 18T and 18R, two isolation transformers 20T and 20R, two common-mode chokes 22T and 22R, and an RJ-45 cable connector 24, all situated on an Ethernet adapter card (not indicated). Twisted-pair cables 10T and 10R are part of a larger cable having a plug (not shown) that plugs into RJ-45 connector 24 along an edge of the adapter card.

Interface controller 12 controls the transmission of outgoing data to cable 10T and the reception of incoming data from cable 10R. 10Base-T transceiver 14 converts non-differential outgoing data from controller 12 into differential form represented by signals TXO+ and TXO−. The differential outgoing data moves through resistors 16T, filter 18T, transformer 20T, and choke 22T where, in modified differential form represented by signals TX+ and TX−, the outgoing data is supplied through RJ-45 connector 24 to outgoing cable 10T as a data stream moving at the 10Base-T rate of 10 Mbps.

Before being furnished to outgoing copper cable 10T, the outgoing data is Manchester encoded to reduce electromagnetic interference ("EMI"). The Manchester encoding causes some portions of the data stream to be pulses at 10 MHz while other portions are pulses at 5 MHz. In low-pass filtering the outgoing data, filter 18T typically removes frequency components above approximately 15–20 MHz. This is below the 30-MHz frequency above which the Federal Communications Commission ("FCC") places controls on electromagnetic radiation from unintentional radiators.

Differential incoming data on incoming copper cable 10R is supplied through connector 24 as signals RX+ and RX−. The incoming data passes through choke 22R, transformer 20R, filter 18R, and resistors 16R where, in modified differential form represented by signals RXI+ and RXI−, the incoming data is furnished to transceiver 14 for conversion to non-differential form and transfer to controller 12.

The ever growing need to transfer more information faster accompanied by increases in data processing capability, is necessitating an expansion to data transfer rates considerably higher than the 10-Mbps rate prescribed by the 10Base-T protocol. As a consequence, the 100Base-TX protocol has been established for extending IEEE Standard 802.3 to accommodate data moving at an effective transfer rate of 100 Mbps through twisted-pair cables of presently existing types.

Under the 100Base-TX protocol, certain control bits are incorporated into the data before it is placed on a twisted-pair cable. The result is that the data and control signals actually move through a twisted-pair cable at 125 Mbps. The 125-Mbps cable rate corresponds to a maximum pulse frequency of 62.5 MHz. Since this exceeds the 30-MHz frequency above which the FCC requires that EMI be controlled, the 100Base-TX protocol specifies that the data be scrambled and provided with a trinary MLT-3 (multi-level transmit/three levels) coding before entering a twisted-pair cable.

In expanding IEEE Standard 802.3 to the 100Base-TX protocol, the physical transmission media will sometimes need to be capable of handling data transferred through twisted-pair cables at both the 100Base-TX rate and the lower 10Base-T rate. Accordingly, a user-friendly apparatus that can transfer data at both rates is desirable.

In particular, a person using information processing equipment capable of handling data moving through twisted-pair cables at either the 10Base-T rate or the 100Base-TX rate should not have to throw a switch, or make another such physical adjustment, when the data transfer rate changes from 10Base-T to 100Base-TX and vice versa. Also, when connecting a twisted-pair cable to data transfer apparatus, the user should not have to make accommodations depending on whether the cable comes from equipment that can handle data moving at the 10Base-T rate, at the 100Base-TX rate, or at both rates.

To keep the cost low, it is desirable to use a small number of items such as isolating transformers, which are relatively expensive, and cable connectors in transferring data at both rates. Furthermore, the information-processing circuitry components which provide data to, and receive data from, the isolating transformers at the 10Base-T and 100Base-TX rates should be readily manufacturable as a single integrated circuit.

GENERAL DISCLOSURE OF THE INVENTION

The present invention furnishes an electronic apparatus capable of meeting the foregoing objectives. The apparatus of the invention functions as an interface between (a) electronic equipment capable of transferring data at either of two materially different data transfer rates and (b) one or more communication cables, such as twisted-pair cables, that carry data to/from other places. The present apparatus is typically used in the physical layer of a LAN.

The present interface apparatus needs only a single pair of isolation transformers for transferring data at the two rates, one of the transformers being used for data transmission at both rates, and the other being used for data reception at both rates. The invention thus normally employs half as many isolation transformers as would be necessary if a separate isolation transformer were used for each data rate during transmission and for each data rate during reception. This reduces the cost considerably.

Unlike a less sophisticated dual-rate data-transfer apparatus in which one cable connection mechanism, such as an RJ-45 cable connector, would be utilized in transferring data at one rate and another cable connection mechanism would be employed in transferring data at the other rate, the interface apparatus of the invention needs only a single cable connection mechanism. The invention thereby avoids manual cable connector switching that would arise from using more than one cable connection mechanism. As a result, EMI is reduced.

When unplugging a cable from the present interface apparatus and plugging in another cable that may carry data moving at a different rate, a user does not have to remember or try to figure out which of two cable connection mechanisms is to receive the cable. The likelihood of making a wrong hook-up is essentially zero. Also, when the data transfer rate changes from one of the rates to the other, the interface apparatus of the invention automatically adjusts for the change in transfer rate. A user does not have to take any action to help implement the change. In short, the invention is very user friendly.

Moving to the basic architecture of the invention, in one aspect, an electronic apparatus for transmitting data contains transmitter circuitry, a transmit isolation transformer, and a cable connection mechanism. The isolation transformer has a primary winding and a secondary winding. The transmitter circuitry provides outgoing data to the primary winding. The cable connection mechanism provides outgoing data from the secondary winding to a communication cable. The transformer isolates the transmitter circuitry and associated electronic equipment from other such electronic equipment connected elsewhere to the cable.

The transmitter circuitry is capable of transmitting data at two or more different data transfer rates. In particular, the transmitter circuitry low-pass filters digital data to produce outgoing data which is transmitted to the primary winding at a first data rate. The low-pass filtering is preferably accomplished with the assistance of a digital waveshaper incorporated into the transmitter circuitry. In addition, the transmitter circuitry transmits second outgoing data to the primary winding at a second data rate different from, usually greater than, the first data transfer rate.

Importantly, the transmitter circuitry is capable of generating current-sourced data signals at both of the data rates and then converting the current-sourced signals into impedance-produced voltage signals that form the outgoing data. This capability is typically achieved by providing the transmitter circuitry with the following components in addition to the digital waveshaper mentioned above: an amplifier, composite current-source amplifier circuitry, and impedance circuitry. The digital waveshaper furnishes one or more first intermediate data signals. The amplifier furnishes one or more second intermediate data signals.

The current-source amplifier circuitry converts the first and second intermediate signals respectively into first and second current-sourced signals. Preferably, the cur[]rent-source amplifier circuitry is implemented with transconductance (or transadmittance) amplifying circuitry that converts the voltages of the intermediate signals into the current-sourced signals. The impedance circuitry then converts the first and second current-sourced signals respectively into the first and second outgoing data.

By configuring the transmitter circuitry in the foregoing manner, the impedance circuitry interfaces with the immediately preceding circuitry—i.e., the current-source amplifier circuitry—in a simple manner. This facilitates designing the transmitter circuitry as a single monolithic integrated circuit. The invention thus provides a substantial technical advance.

The composite current-source amplifier circuitry can be implemented in different ways depending on design goals. In one implementation, the current-source amplifier circuitry contains first and second current-source circuits. In response to each first intermediate signal, the first current-source circuit provides a first current-sourced signal to the impedance circuitry. In response to each second intermediate signal, the second current-source circuitry similarly provides a second current-sourced signal to the impedance circuitry.

The first and second current-source circuits are merged into a single multiplexed current-source circuit in another implementation. Specifically, the composite current-source circuitry is formed with a multiplexer and a current-source circuit. The multiplexer selectively provides at least one further intermediate data signal that constitutes either each first intermediate data signal or each second intermediate data signal. In response to each further intermediate data signal, the current-source circuit provides the impedance circuitry either with each first current-sourced signal or with each second current-sourced signal. The multiplexed current-source circuit forms a common driver for data transmitted at both data rates.

All of the outgoing data is preferably transmitted in a differential manner. In this case, each of the above-mentioned current-source circuits is formed with a pair of current sources. Each current source is preferably a voltage-controlled current source, often referred to as a transconductance (or transadmittance) amplifier. Also, the communication cable is typically a twisted-pair cable for differentially transmitting the outgoing data.

In another aspect of the invention, the present apparatus includes circuitry for receiving incoming data at each of the first and second data rates. The transmitter circuitry is extended to become transceiver circuitry that contains a data-receiving section. Incoming data from a communication cable, typically another twisted-pair cable, is supplied through a receive transformer to the data-receiving section of the transceiver circuitry.

Communication cables besides those of the twisted-pair type can be utilized in the invention. Such cables, of which one example is optical cables, can be employed in combination with the twisted-pair cables. Suitable circuitry interfaces these general data-transmission cables to the transmit and receive transformers.

Typically, the present apparatus transfers data at the lower rate in accordance with the 10Base-T protocol. Data is transferred at the higher rate in accordance with the 100Base-TX protocol. The apparatus of the invention thereby meets IEEE Standard 802.3 for both 10Base-T and 100Base-TX data transfer.

BRIEF DESCRIPTION OF THE DRAWINGS

FIGS. 2a, 2b, and 2c (collectively "FIG. 2") together constitute a block diagram of an interface transceiver apparatus that meets the 10Base-T and 100Base-TX communication protocols for twisted-pair cables.

Like reference symbols are employed in the drawings and in the description of the preferred embodiments to represent the same or very similar item or items. Input and output terminals, where shown in the drawings, are indicated by dark vertical rectangles.

DESCRIPTION OF THE PREFERRED EMBODIMENTS

In the following description, a pair of differential signals means two signals whose voltage or current waveforms are largely complementary (or inverse) to each other. The individual signals of a pair of differential signals are indicated by reference symbols respectively ending with "+"and "−"notation—e.g., S+ and S−. The composite notation "±" is employed to indicate both differential signals using a single reference symbol—e.g., S±. The same convention is employed with paired elements through which differential signals pass.

The present invention, as generally described below in the material beginning with FIG. 6, furnishes an interface transceiver apparatus that utilizes a single cable connector and a single pair of isolation magnetics for processing data moving on twisted-pair cables at either of two materially different data transfer rates according to the teachings of the invention. In particular, the present interface transceiver apparatus meets the 10Base-T and 100Base-TX protocols of IEEE Standard 802.3 in switching between the 10Base-T cable data rate of 10 Mbps and the 100Base-TX cable data rate of 125 Mbps, effectively 100 Mbps. A distinguishing feature of the present invention is that outgoing data at each of the data rates is provided by generating current-sourced differential data signals and then converting the current-sourced signals into impedance-produced differential voltage signals that constitute the outgoing data.

U.S. Pat. No. 5,541,957 on another of my inventions discloses a 10Base-T/100Base-TX interface transceiver apparatus similar to that of the present invention except that only outgoing data at the 100Base-TX data rate is generated by converting current-sourced data signals into impedance-produced outgoing voltage data. Current-to-voltage conversion of this type is not employed in generating outgoing 10Base-T data in U.S. Pat. No. 5,541,957. Nonetheless, an understanding of the present invention can be facilitated by first looking at the 10Base-T/100Base-TX transceiver apparatus in U.S. Pat. No. 5,541,957, as updated here, before considering the inventive material that begins with the description of FIG. 6.

Figure 1:
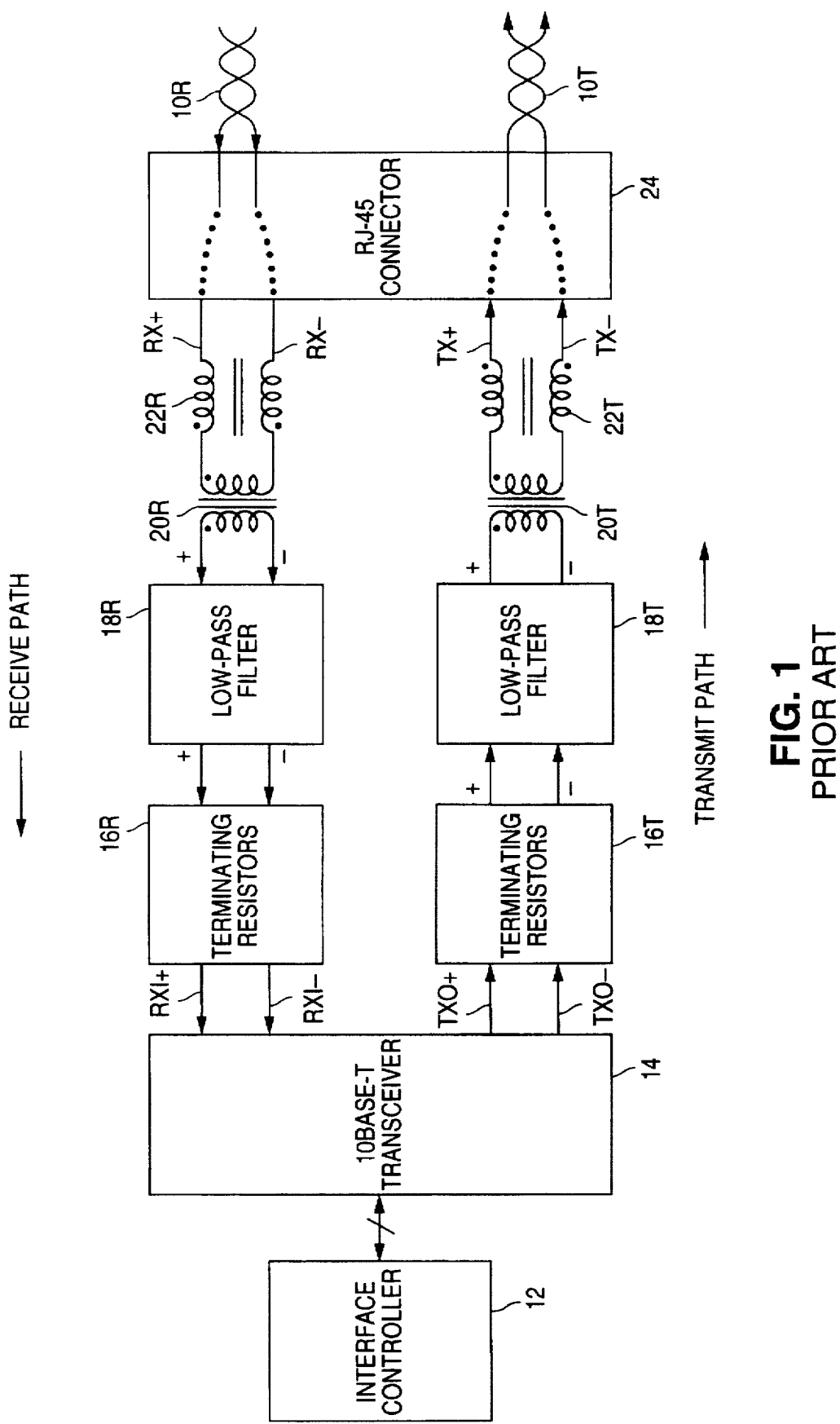
FIG. 1 is a block diagram of a prior art twisted-pair MAU.
Figure 2A:
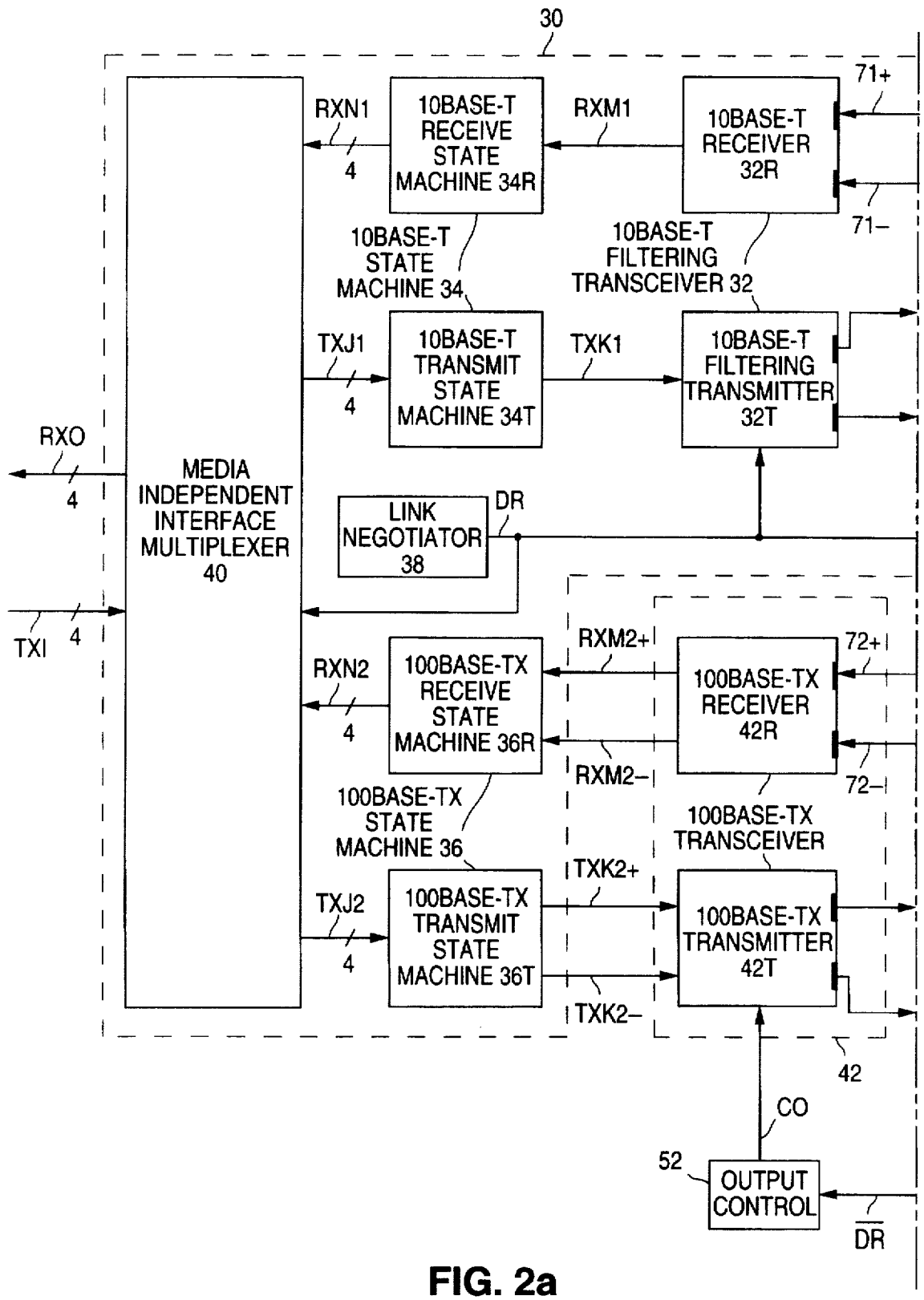
Figure 2B:
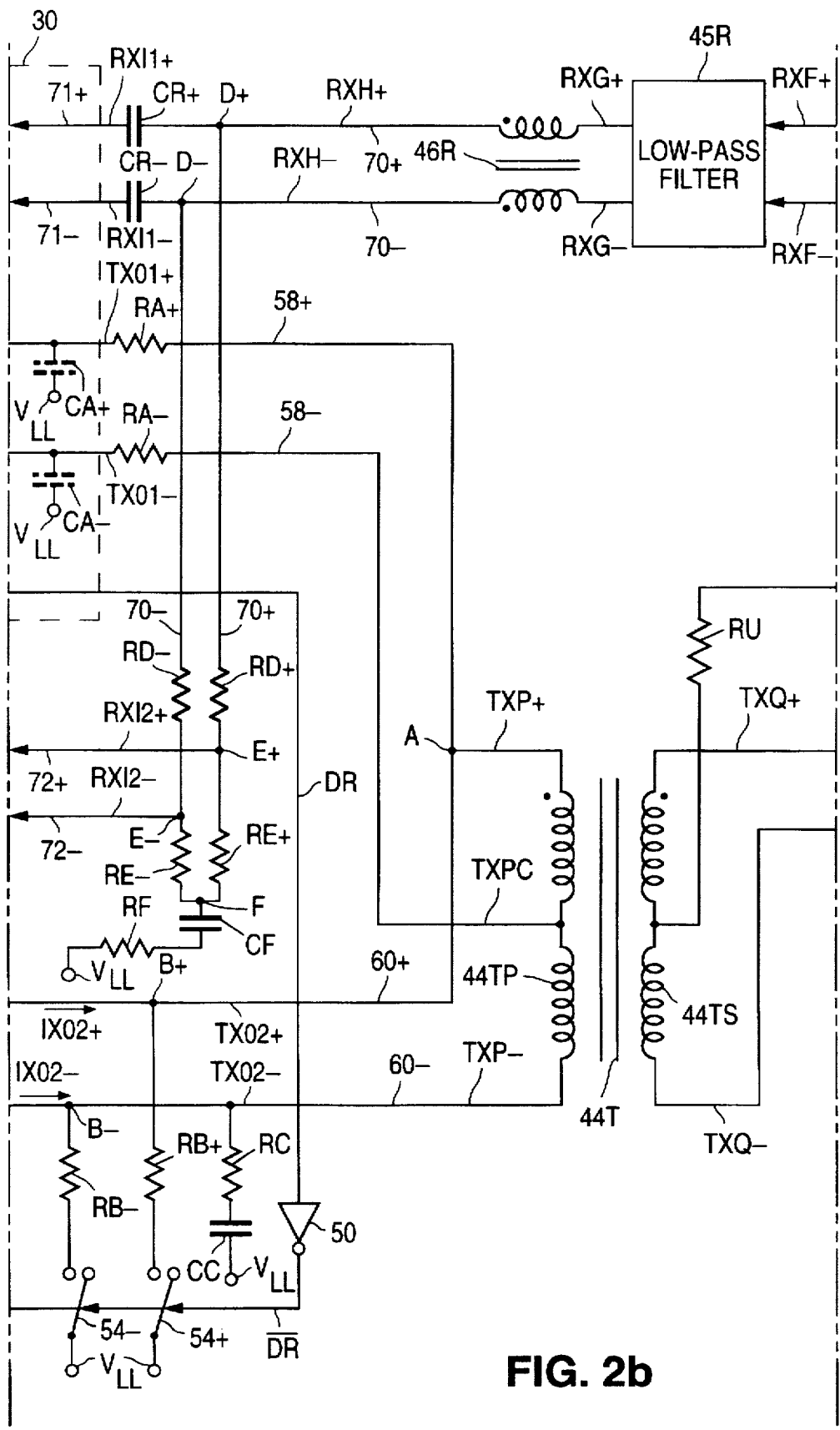

FIG. 2 illustrates the interface transceiver apparatus of U.S. Pat. No. 5,541,957. The interface apparatus of FIG. 2 is incorporated in information processing equipment such as a personal computer, a work station, a file server, a bridge, a repeater, or DTE in a LAN. The interface apparatus is typically situated on an Ethernet adapter card (or board) along with a suitable media-access controller. However, the apparatus can be a stand-alone unit that connects to a media-access controller located elsewhere.

The interface apparatus of FIG. 2 transfers—i.e., transmits and receives—data between (a) the information processing equipment in which the apparatus is situated or to which the apparatus is directly connected, hereafter referred to as the "home equipment", and (b) a pair of twisted-pair cables connected at their remote ends to other such information processing equipment, hereafter referred to as the "remote equipment". Data transmission occurs when data is sent from the home equipment through the interface apparatus and one of the twisted-pair cables to the remote equipment. Data reception occurs when data is sent from the remote equipment through the other twisted-pair cable and the interface apparatus to the home equipment.

One of the components of the apparatus of FIG. 2 is a signal-processing/10Base-T transceiver physical-layer integrated circuit ("IC") 30 consisting of a 10Base-T filtering transceiver 32, a 10Base-T state machine 34, a 100Base-TX state machine 36, a link negotiator 38, and a media-independent interface multiplexer 40. Transceiver 32 and state machine 34 together transmit, receive, and process data in accordance with the 10Base-T protocol. Transceiver 32 is divided into a 10Base-T transmitter 32T and a 10Base-T receiver 32R. State machine 34 is formed with a 10Base-T transmit state machine 34T and a 10Base-T receive state machine 34R.

State machine 36 and a separate 100Base-TX transceiver physical-layer IC 42 together transmit, receive, and process data in accordance with the 100Base-TX protocol. State machine 36 is formed with a 100Base-TX transmit state machine 36T and a 100Base-TX receive state machine 36R. Transceiver IC 42 is divided into a 100Base-TX transmitter 42T and a 100Base-TX receiver 42R. The interface apparatus of FIG. 2 further contains a transmit isolation transformer 44T, a receive isolation transformer 44R, a transmit low-pass filter 45T, a receive low-pass filter 45R, a transmit common-mode choke 46T, a receive common-mode choke 46R, an RJ-45 jack connector 48, an inverter 50, an output control 52, switches 54+ and 54−, and various resistors and capacitors (discussed further below), all mounted with ICs 30 and 42 on an Ethernet card (not indicated). The Ethernet card is preferably implemented as a multi-layer printed circuit board.

Outgoing data from the interface apparatus of FIG. 2 is transmitted to the remote equipment on an outgoing twisted-pair cable 56T consisting of a pair of twisted electrical lines. Similarly, the interface apparatus receives incoming data from the remote equipment on an incoming twisted-pair cable 56R consisting of a pair of twisted electrical lines. Cables 56T and 56R are formed with copper wires. Each of cables 56T and 56R has a characteristic impedance of approximately 100 ohms.

Twisted-pair cables 56T and 56R are usually enclosed in the sheath of a larger cable (not shown) which terminates in a plug 57 insertable into RJ-45 connector 48 so as to connect cables 56T and 56R to the interface apparatus. The larger cable is typically a Category 5 unshielded twisted-pair cable or a Type 1 shielded twisted-pair cable. In the Category 5 unshielded case, the larger cable typically contains four copper twisted-pair cables, two of which constitute cables 56T and 56R.

The interface apparatus of FIG. 2 operates between a low supply voltage $V_{LL}$ and a high supply voltage $V_{HH}$ (not shown in FIG. 2) provided from respective voltage/current supplies. $V_{LL}$ and $V_{HH}$ preferably are 0 volt (ground reference) and 5 volts so that the power-supply voltage $V_{HH}-V_{LL}$ is 5 volts.

Link negotiator 38 periodically generates a burst of link pulses which carry information identifying the data processing capability of the home equipment—i.e., whether the home equipment operates in the 10Base-T mode or the 100Base-TX mode or can operate in either mode, and whether the home equipment can simultaneously transmit and receive data (full duplex) or can do only one of transmit and receive at a time (half duplex). Each burst of link pulses is transmitted along outgoing cable 56T to the remote equipment. In particular, the link pulses pass along a line (not indicated) to 10Base-T transmitter 32T where they are converted into differential form and supplied along the 10Base-T data path described below to outgoing cable 56T.

A link negotiator in the remote equipment likewise periodically generates a burst of link pulses which carry information identifying the data processing capability of the remote equipment. These link pulses are differentially transmitted along incoming cable 56R to the apparatus of FIG. 2. The differential link pulses from the remote equipment are then provided along the incoming data path described below to 10Base-T receiver 32R and furnished in single-ended form along a line (not indicated) to link negotiator 38. Both link negotiators follow the format prescribed in "Media Access Control (MAC) Parameters, Physical Layer, Medium Attachment Units, and Repeater for 100 Mb/s Operation, Type 100Base-T (Clauses 21–30)," IEEE Standards for Local and Metropolitan Area Networks: Supplement to Carrier Sense Multiple Access with Collision Detection (CSMA/CD) Access Method and Physical Layer Specifications, IEEE Std 802.3u-1995, Oct. 26, 1995, Clause 28, pages 221–269, the contents of which are incorporated by reference herein.

Link negotiator 38 furnishes a data rate signal DR at a high level when data is to be transferred at the 10Base-T rate. Rate signal DR is supplied at a low value when data is to be transferred at the 100Base-TX rate.

During data transmission, the home equipment generates a binary NRZ (non-return-to-zero) data signal TXI which is to be converted into differential form for transmission on outgoing cable 56T. Data signal TXI and rate signal DR are furnished to multiplexer 40. Multiplexer 40 has four lines available for signal TXI. For 10Base-T transmission, signal TXI is either a nibble—i.e., four bits in parallel—coming in at 2.5 Mbps on each of the four lines to produce a cumulative rate of 10 Mbps or a one-bit signal coming in at 10 Mbps on the line that otherwise carries the least significant bit ("LSB") of the four-bit nibble. For 100Base-TX transmission, signal TXI is a four-bit nibble coming in at 25 Mbps on each of the four lines to produce a cumulative rate of 100 Mbps.

If rate signal DR is high indicating selection of the 10Base-T data transfer rate, multiplexer 40 passes data signal TXI to 10Base-T transmit state machine 34T in the form of an NRZ data signal TXJ1. Depending on the condition of signal TXI, data signal TXJ1 is either a nibble or a one-bit signal. If signal DR is low indicating selection of the 100Base-TX data transfer rate, multiplexer 40 provides signal TXI to 100Base-TX transmit state machine 36T in the form of an NRZ nibble data signal TXJ2.

For 10Base-T data transmission, 10Base-T state machine 34T applies a Manchester coding to data signal TXJ1 to create a one-bit Manchester-coded outgoing data stream TXK1 moving at 10 Mbps. This includes serializing signal TXJ1 when it is a four-bit nibble.

Data stream TXK1 is supplied to 10Base-T transmitter 32T. Due to the Manchester coding, the TXK1 data stream consists of 100-ns generally square pulses at 5 MHz and 50-ns generally square pulses at 10 MHz. Since 10 MHz is the highest pulse frequency in the TXK1 data stream, the 10Base-T data eventually supplied to outgoing cable 56T has a characteristic data rate frequency of 10 MHz.

Transmitter 32T contains a digital low-pass waveshaping filter (not separately shown in FIG. 2) that filters the TXK1 data stream to attenuate frequency components above a cut-off frequency between 10 MHz and 20 MHz—i.e., between the characteristic data rate frequency and the second harmonic of the characteristic data rate frequency. In so doing, the square TXK1 pulse waveforms are converted into rounded shapes that conform-to the voltage template specified by the 10Base-T protocol. The cut-off frequency of the digital filter is typically 15 MHz.

The filtering is done in such a way that the waveforms for the portions of the Manchester-coded TXK1 data stream formed with 50-ns pulses are largely shaped as 10-MHz sine waves. The rising and falling edges of the waveforms for the portions of the TXK1 data stream consisting of 100-ns pulses are provided with substantially the same sine-wave shape as the 50-ns pulses. Preemphasis is applied to the 100-ns TXK1 pulses to reduce inter-symbol jitter. Transmitter 32T also converts the TXK1 data stream into a differential voltage-sourced format having an approximate 5-volt differential peak-to-peak swing.

Figure 3:
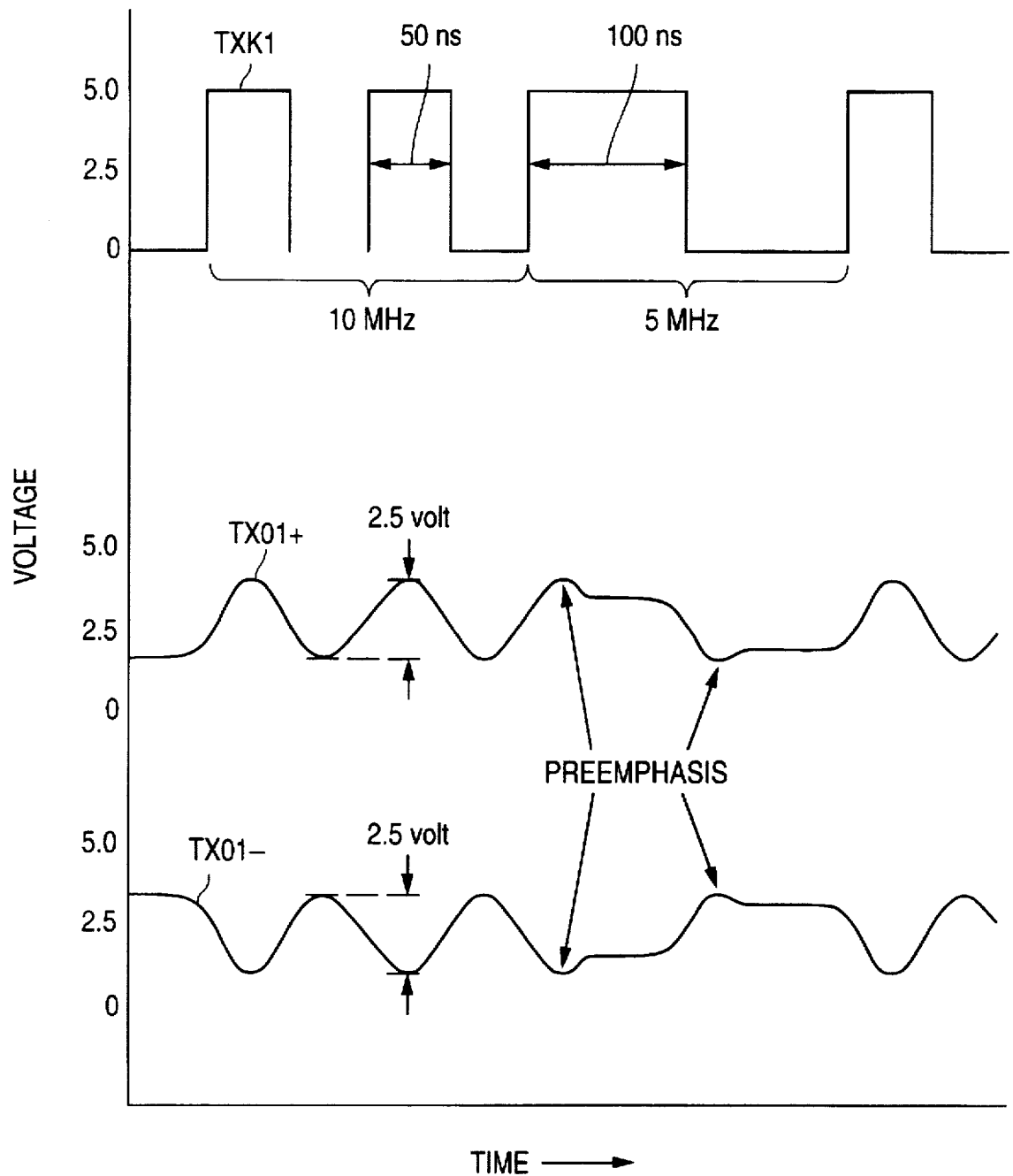
FIG. 3 is a waveform diagram that illustrates the waveshape filtering of the 10Base-T transmitter in the interface apparatus of FIG. 2.

Transmitter 32T has a pair of three-statable data output terminals, referred to as the TXO1+ and TXO1− terminals, from which it respectively provides differential outgoing data signals TXO1+ and TXO1−. When data rate signal DR is high so that 10Base-T operation is selected, data signals TXO1± constitute the filtered versions of the Manchester-coded TXK1 data stream described above. That is, the TXO1± data stream moves at 10 Mbps with preemphasis and a 5-volt peak-to-peak swing across the TXO1± terminals. Each of signals TXO1± has an individual peak-to-peak swing of 2.5 volts. FIG. 3 depicts waveforms which are simplified in time and shape and which illustrate the filtering performed by transmitter 32T in converting the TXK1 data stream into differential signals TXO1± for the high DR case.

The TXO1+ and TXO1– terminals of transmitter 32T are coupled respectively through equal-value source terminating resistors RA+ and RA– to outgoing electrical conductors 58+ and 58–. Conductors 58± are short, usually less than 1 cm in length, so that the antenna (radiating) effect on EMI is small. Resistors RA± attenuate the 5-volt differential peak-to-peak swing of signals TXO1± by approximately 50%.

The TXO1± terminals go into a high-impedance state when rate signal DR is low. This electrically disconnects resistors RA± and, consequently, conductors 58± from transmitter 32T during 100Base-TX operation.

For 100Base-TX data transmission, 100Base-TX state machine 36T performs a 4B/5B symbol conversion on four-bit NRZ nibble data TXJ2 coming in at a cumulative data rate of 100 Mbps. The 4B/5B conversion incorporates control signals into the TXJ2 data to produce five-bit symbols moving at a cumulative data rate of 125 Mbps. The control signals indicate start of transmission, end of transmission, and idle.

State machine 36T scrambles the five-bit NRZ symbol data using an appropriate random-number function. State machine 36T then converts the NRZ coding of the scrambled five bit symbol data to NRZI (non-return-to-zero, invert-on-one) coding and serializes the scrambled five-bit NRZI symbol data to generate a one-bit binary NRZI data stream moving at 125 Mbps. This corresponds to a maximum pulse frequency of 62.5 MHz. Finally, state machine 36T converts the scrambled serial NRZI data to a differential format to produce differential data signals TXK2+ and TXK2– moving at 125 Mbps.

100Base-TX transmitter 42T applies an MLT-3 coding to binary NRZI data signals TXK2± to produce a pair of trinary differential data signals moving at 125 Mbps. Since half-height pulses in the scrambled NRZI MLT-3 data can have a minimum pulse width corresponding to a frequency of 62.5 MHz, the 100Base-TX data eventually supplied to outgoing cable 56T has a characteristic data rate frequency of 62.5 MHz. Nonetheless, the net effect of the MLT-3 coding is to cut the maximum fundamental frequency of full-height signal transitions to 31.25 MHz. The combination of scrambling and MLT-3 coding flattens the frequency spectrum and shifts the spectral energy downward (i.e., to lower frequencies) so as to meet the standards prescribed by the FCC for electromagnetic radiation from unintentional radiators at frequencies above 30 MHz, specifically the radiated power spectrum at 62.5 MHz.

Transmitter 42T then converts the scrambled differential NRZI MLT-3 data into a pair of differential current-sourced data signals IXO2+ and IXO2–. Transmitter 42T has a pair of three-statable data output terminals, referred to as the TXO2+ and TXO2– terminals, from which it respectively furnishes differential outgoing currents IXO2+ and IXO2–. The TXO2+ and TXO2– terminals are respectively coupled through nodes B+ and B– to outgoing electrical conductors 60+ and 60–. As with conductors 58±, conductors 60± are short, normally less than 1 cm so that the antenna effect on EMI again is small. Differential outgoing data signals TXO2+ and TXO2– are present on conductors 60+ and 60–.

Inverter 50 inverts rate signal DR to produce an inverted data rate signal $\overline{DR}$. Output control 52 which operates in response to signal $\overline{DR}$ furnishes a control signal CO to transmitter 42T. A pair of equal-value resistors RB+ and RB– respectively terminate conductors 60+ and 60–. Resistors RB± provide a matching resistance to the 100-ohm characteristic impedance of outgoing cable 56T during 100Base-TX operation. Resistor RB+ is connected in series with switch 54+ between node B+ and the $V_{LL}$ supply. Resistor RB– is similarly connected in series with switch 54– between node B– and the $V_{LL}$ supply. Switches 54± both respond to signal $\overline{DR}$.

During 100Base-TX operation, the low value of signal DR causes signal $\overline{DR}$ to be high. Switches 54± thereby close so as to couple the TXO2± terminals to the $V_{LL}$ supply by way of terminating resistors RB±. Control signal CO causes currents IXO2± to be supplied at prescribed high current levels. The resulting voltages developed across resistors RB± by currents IXO2± cause outgoing data signals TXO2± to be generated with an approximate 2-volt peak-to-peak swing across conductors 60±. Signals TXO2± move at 125 Mbps with scrambled NRZI and MLT-3 coding.

The IXO2± current-sourced signals are reduced substantially to zero during 10Base-T operation when rate signal DR is high. This electrically disconnects transmitter 42T from conductors 60±. In addition, switches 54± open to remove the electrical termination provided by resistors RB±, thereby allowing resistors RA± to provide the necessary impedance to match the characteristic impedance of incoming cable 56R.

Transmit transformer 44T isolates outgoing cable 56T from the circuitry that produces signals TXO1± and TXO2±. Transformer 44T has a primary winding 44TP and a secondary winding 44TS. Conductors 58+ and 60+ are connected through a node A to the positive (dotted) end of primary winding 44TP. Conductors 58– and 60– are respectively connected to the center tap and negative (undotted) end of winding 44TP. The data signals at the positive end, center tap, and negative end of winding 44TP are respectively indicated as signals TXP+, TXPC, and TXP– in FIG. 2.

The positive and negative ends of secondary winding 44TS respectively furnish differential outgoing data signals TXQ+ and TXQ–. The center tap of winding 44TS is coupled through a resistor RU, a node C, and a common capacitor CV to the $V_{LL}$ supply. Resistor RU provides common-mode termination. Capacitor CV furnishes virtual ground reference as well as voltage isolation between the home and remote equipment so as to protect users from high voltage. For this purpose, capacitor CV typically has a breakdown voltage in excess of 2 kilovolts. Capacitor CV can be implemented as a discrete element or as a built-in part of the multi-layer Ethernet card that carries the circuit components.

During 10Base-T data transmission, conductors 60± are effectively open circuited. Signals TXO1± thereby pass through resistors RA± and onto conductors 58± to become signals TXP+ and TXPC which are respectively transformed into outgoing signals TXQ± moving at 10 Mbps. Since conductor 58– is connected to the center tap of primary winding 44TP, transformer 44T functions as a 1:2 step-up device that converts the approximate 2.5-volt differential peak-to-peak swing of signals TXP+ and TXPC into an approximate 5-volt differential peak-to-peak swing for signals TXQ±.

During 100Base-TX data transmission, conductors 58± are effectively open circuited. Signals TXO2± pass along conductors 60± to become outgoing signals TXP± which are respectively transformed into outgoing signals TXQ± moving at 125 Mbps with the approximate 2.0-volt differential peak-to-peak swing of signals TXO2±.

Parasitic capacitances CA+ and CA– are respectively associated with the TXO1+ and TXO1– output terminals of transmitter 32T. A resistor RC and a (real) capacitor CC are inserted between the $V_{LL}$ supply and conductor 60– at the negative end of winding 44TP. By choosing resistor RC and capacitor CC to have the same respective values as resistor RA+ and capacitance CA+, the apparatus is balanced during 100Base-TX data transmission. This reduces undesired common-mode-to-differential conversion gain.

Transmit low-pass filter 45T filters signals TXQ+ and TXQ– to respectively produce differential outgoing data signals TXS+ and TXS–. In particular, filter 45T attenuates frequency components above a cut-off frequency in the vicinity of 125 MHz. This is above the 62.5-MHz characteristic data rate frequency of the 100Base-TX data supplied to outgoing cable 56T. In the conversion of signals TXO2± (or IXO2±) into signals TXS± during 100Base-TX transmission, low-pass filter 45T attenuates frequency components above approximately 125 MHz.

Low-pass filter 45T is in the data path for signals TXO1±. However, signals TXO1± are supplied from 10Base-T transmitter 32T with frequency components above 20 MHz, typically above 15 MHz, already attenuated due to the low-pass filtering of the digital waveshaper contained in transmitter 32T. Since the cut-off frequency of filter 45T is considerably higher than that of the digital waveshaper, the low-pass filtering action of filter 45T does not significantly affect the conversion of signals TXO1± into signals TXS±.

The apparatus of FIG. 2 is designed so that the 100Base-TX data path does not pass through the digital waveshaping filter in transmitter 32T. Accordingly, the fact that transmitter 32T has a considerably smaller bandwidth than filter 45T is immaterial to 100Base-TX transmission. Importantly, this is accomplished with a single transmit isolation transformer and without using hot signal switching in the data-transmission paths.

Transmit common-mode choke 46T converts signals TXS+ and TXS– respectively into outgoing differential data signals TX+ and TX–. Choke 46T attenuates the common-mode-to-differential conversion gain. Signals TX+ pass through RJ-45 connector 48 and plug 57 where they are supplied to the two twisted lines of cable 56T for transmission to the remote equipment.

Figure 4:
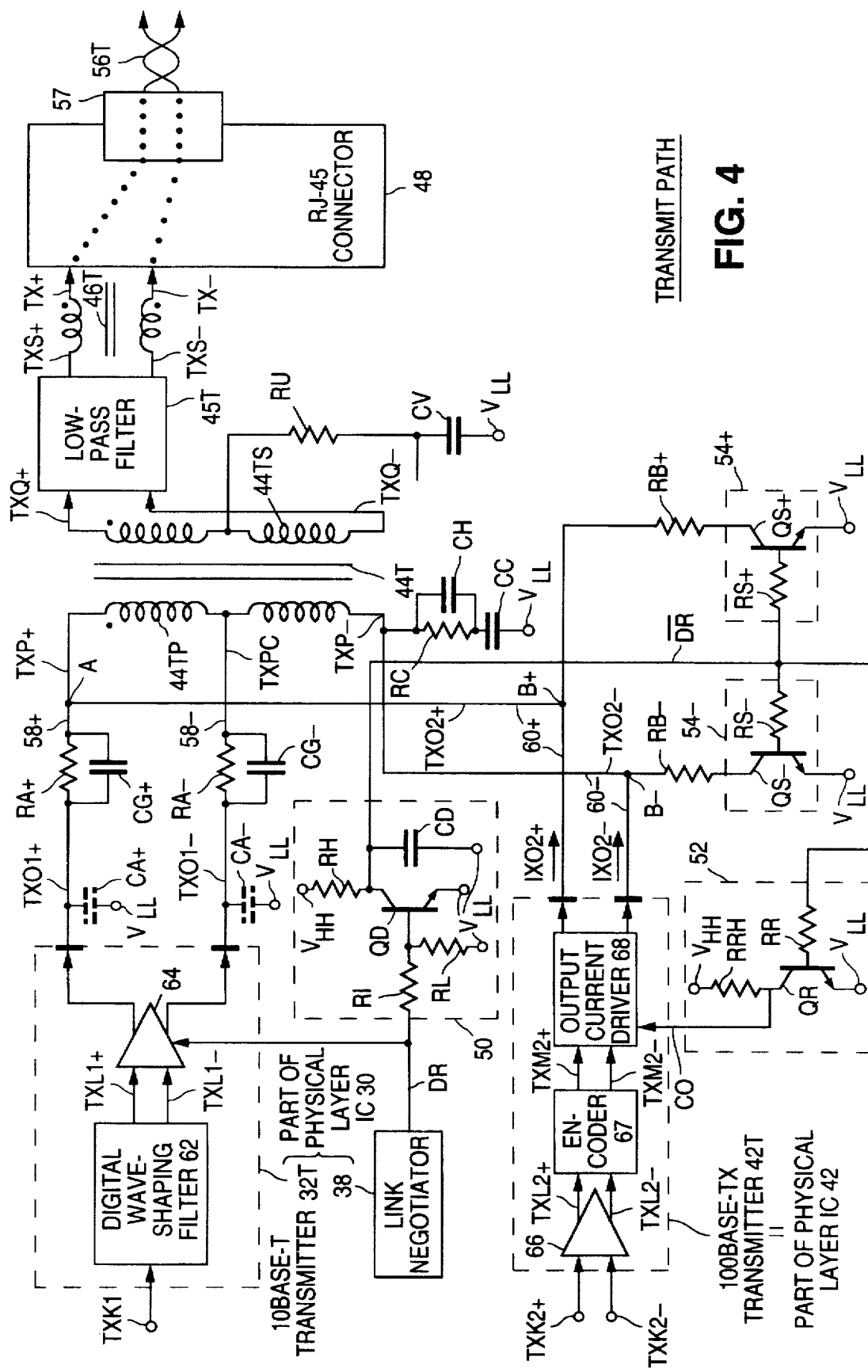
FIG. 4 is a block/circuit diagram of an embodiment of part of the differential data transmission path for the interface apparatus in FIG. 2.

FIG. 4 depicts a preferred embodiment of part of the data-transmission path in the apparatus of FIG. 2.

In particular, FIG. 4 illustrates details for the differential transmission path section extending from transmitters 32T and 42T to outgoing cable 56T.

Beginning with inverter 50, it preferably consists of an NPN transistor QD, an input resistor RI, an output resistor RH, a further resistor RL, and a capacitor CD. Output control 52 is formed with an NPN transistor QR, an input resistor RR, and a reference resistor RRH. Switch 54+ consists of an NPN transistor QS+ and an input resistor RS+. Switch 54– is similarly formed with an NPN transistor QS– and an input resistor RS–.

10Base-T transmitter 32T consists of a digital waveshaping filter 62 and a three-statable output buffer 64. Waveshaping filter 62 filters the TXK1 data stream in the manner described above to generate filtered differential data signals TXL1+ and TXL1– having preemphasis and an approximate 5-volt differential peak-to-peak swing. The TXL1± waveforms meet the preemphasized waveshape specifications of the 10Base-T protocol. Output buffer 64 is controlled by data rate signal DR.

The transmit path preferably include three equal-value pole-zero cancellation capacitors CG+, CG–, and CH (not shown in FIG. 2). Capacitor CG+ is connected in parallel with source terminating resistor RA+. Capacitor CG– is similarly connected in parallel with source terminating resistor RA–. Capacitor CH is connected in parallel with resistor RC to balance the load (or time constant) for the undriven half of primary winding 44TP of transmit transformer 44T. Capacitors CG± and CH provide pole-zero cancellation to maintain the transmit source impedance at a constant value that matches the characteristic (100-ohm) impedance of twisted pair cable 56T and reduces the 10Base-T return loss.

100Base-TX transmitter 42T contains an input buffer 66, an encoder 67, and a programmable output current driver 68. Input buffer 66 amplifies NRZI signals TXK2± to produce binary differential data signals TXL2+ and TXL2–. Encoder 67 generates trinary differential data signals TXM2+ and TXM2– by applying MLT-3 codings to data signals TXL2±. Output current driver 68 converts differential signals TXM2± into current-sourced signals IXO2± and supplies currents IXO2± to the TXO2± terminals.

Next consider data reception. Turning back to FIG. 2, receive isolation transformer 44R has a primary winding 44RP and a secondary winding 44RS. Differential data signals RX+ and RX– are supplied from the two twisted lines of incoming cable 56R to the ends of primary winding 44RP at either the 10Base-T data rate of 10 Mbps or the 100Base-X cable data rate of 125 Mbps. The center tap of winding 44RP is coupled through a resistor RW, node C, and capacitor CV to the $V_{LL}$ supply. As with resistor RU, resistor RW provides common-mode termination.

Transformer 44R converts differential incoming data signals RX+ and RX– respectively into differential data signals RXF+ and RXF– supplied from the ends of secondary winding 44RS at substantially the same voltage swing as that of signals RX±. In so doing, transformer 44R isolates incoming cable 56R from the data-receiving circuitry that processes signals RXF±. Receive low-pass filter 45R produces differential data signals RXG+ and RXG– by respectively filtering data signals RXF+ and RXF– to attenuate frequency components above a cut-off frequency in the vicinity of 125 MHz.

The ends of secondary winding 44RS are electronically coupled through filter 45R and receive common-mode choke 46R respectively to electrical conductors 70+ and 70–. Choke 46R converts signals RXG+ and RXG– respectively into differential incoming data signals RXH+ and RXH– supplied on conductors 70+ and 70–. In so doing, choke 46R attenuates the common-mode-to-differential conversion gain. Conductors 70± have a differential characteristic impedance of 100 ohms—i.e., the same as that of cable 56R.

10Base-T receiver 32R and 100Base-TX receiver 42R have different DC input bias levels. To avoid DC input discrepancy between receivers 32R and 42R, incoming signals RXH± are AC coupled to receiver 32R. In particular, conductors 70+ and 70– are tapped at nodes D+ and D– from where they are coupled through equal-value DC blocking capacitors CR+ and CR– to a pair of data input terminals, referred to as the RXI1+ and RXIL– terminals, of receiver 32R. Capacitors CR+ and CR– respectively block any DC components present in signals RXH+ and RXH– to produce differential incoming data signals RXI1+ and RXIL– at the RXI1+ and RXIL– terminals. Signals RXI1± thus have substantially the same AC voltage swing as signals RXH±.

To keep the antenna effect low, electrical lines 71+ and 71– that connect capacitors CR± to the RXI1± terminals are less than 1 cm in length.

Signals RX±, and thus signals RXI1±, are Manchester coded during 10Base-T data reception. Receiver 32R converts signals RXI1± into a single Manchester-coded data stream RXM1 moving at 10 Mbps. 10Base-T receive state machine 34R decodes the RXM1 data stream and converts it into an NRZ data signal RXN1. Depending on the format desired, state machine 34R generates signal RXN1 as a nibble on four lines or as a one-bit signal on the line that otherwise carries the LSB of the four-bit nibble.

Conductors 70± are further coupled in a daisy chain—i.e., non interruptible—manner to receiver 42R. In particular, conductors 70+ and 70– are coupled respectively through a pair of voltage dividers to a pair of data input terminals, referred to as the RXI2+ and RXI2– terminals, of receiver 42R. During 100Base-X reception, the voltage swings of signals RXH± are slightly high for receiver 42R. The voltage dividers attenuate signals RXH+ and RXH– to respectively provide the RXI2+ and RXI2– terminals with differential data signals RXI2+ and RXI2– at voltage swings that provide good adaptive equalization.

The voltage dividers are respectively formed with equal-value terminating resistors RD+ and RD– and equal-value terminating resistors RE+ and RE– connected to resistors RD+ and RD– by way of divider nodes E+ and E– from which signals RXI2+ and RXI2– are furnished to receiver 42R. Resistors RD± are connected to conductors 70±. Electrical lines 72+ and 72– that connect nodes E± to the RXI2± terminals are less than 1 cm in length so as to keep the antenna effect low. Resistors RE± are connected together at a node F. In combination, resistors RD± and RE± form a network that terminates lines 70± with an approximate 100-ohm impedance to match the characteristic 100-ohm impedance of cable 56R.

A DC blocking capacitor CF is connected between node F and the $V_{LL}$ supply. Capacitor CF provides DC isolation as well as common-mode reference. A further resistor RF may be connected in series with capacitor CF.

Signals RX±, and thus signals RXI2±, are encoded with a scrambled NRZI and MLT-3 coding during 100Base-TX data reception. 100Base-TX receiver 42R determines whether signals RXI2± meet certain minimum input squelch voltage thresholds and, when met, appropriately amplifies signals RXI2±. In addition, receiver 42R decodes the amplified MLT-3 data to produce a pair of binary NRZI differential data signals RXM2+ and RXM2– moving at 125 Mbps.

100Base-TX receive state machine 36R converts the NRZI coding of scrambled differential data signals RXM2± to NRZ coding in single-ended form. State machine 36R then deserializes the single-ended NRZ data stream to generate five-bit symbols moving at a cumulative date rate of 125 Mbps. State machine 36R descrambles the five-bit NRZ symbol data.

Finally, state machine 36R performs a 5B/4B symbol conversion on the descrambled NRZ five-bit symbol data to generate a four-bit nibble data signal RXN2. The 5B/4B conversion removes control signals imbedded into the RX± data stream for twisted-pair cable transmission so as to recover the original information transmitted from the remote equipment. During the 5B/4B conversion, the cumulative data rate is reduced to 100 Mbps. Each bit of nibble RXN2 moves at 25 Mbps.

Multiplexer 40 generates an NRZ data signal RXO for supply to the home equipment. Multiplexer 40 has four lines available for signal RXO. If rate detection signal DR is high indicating selection of the 10Base-T data rate, signal RXN1 passes through multiplexer 40 to become signal RXO on all four lines as a nibble at 2.5 Mbps per line or on one line as a one-bit signal at 10 Mbps. If signal DR is low indicating selection of the 100Base-TX data rate, signal RXN2 passes through multiplexer 40 to become signal RXO as a nibble on the four lines at 25 Mbps per line.

By furnishing receivers 32R and 42R with received data by way of the daisy chain consisting of conductors 70±, capacitors CR±, and the voltage dividers, the characteristic impedance of conductors 70± is largely constant during normal apparatus operation. No hot switching elements need to be placed in the data reception path in the apparatus of FIG. 2. The absence of hot switching elements in the data reception path avoids discontinuities in the characteristic impedance of conductors 70± and thereby avoids EMI and reflections that would result from such discontinuities.

The voltage dividers implemented with termination resistors RD± and RE± enable incoming signals RXI2± to be provided at optimum adaptive equalization voltage levels during 100Base-TX operation. As with the data transmission path, only a single isolation transformer needs to be employed in the data reception path.

Figure 5:
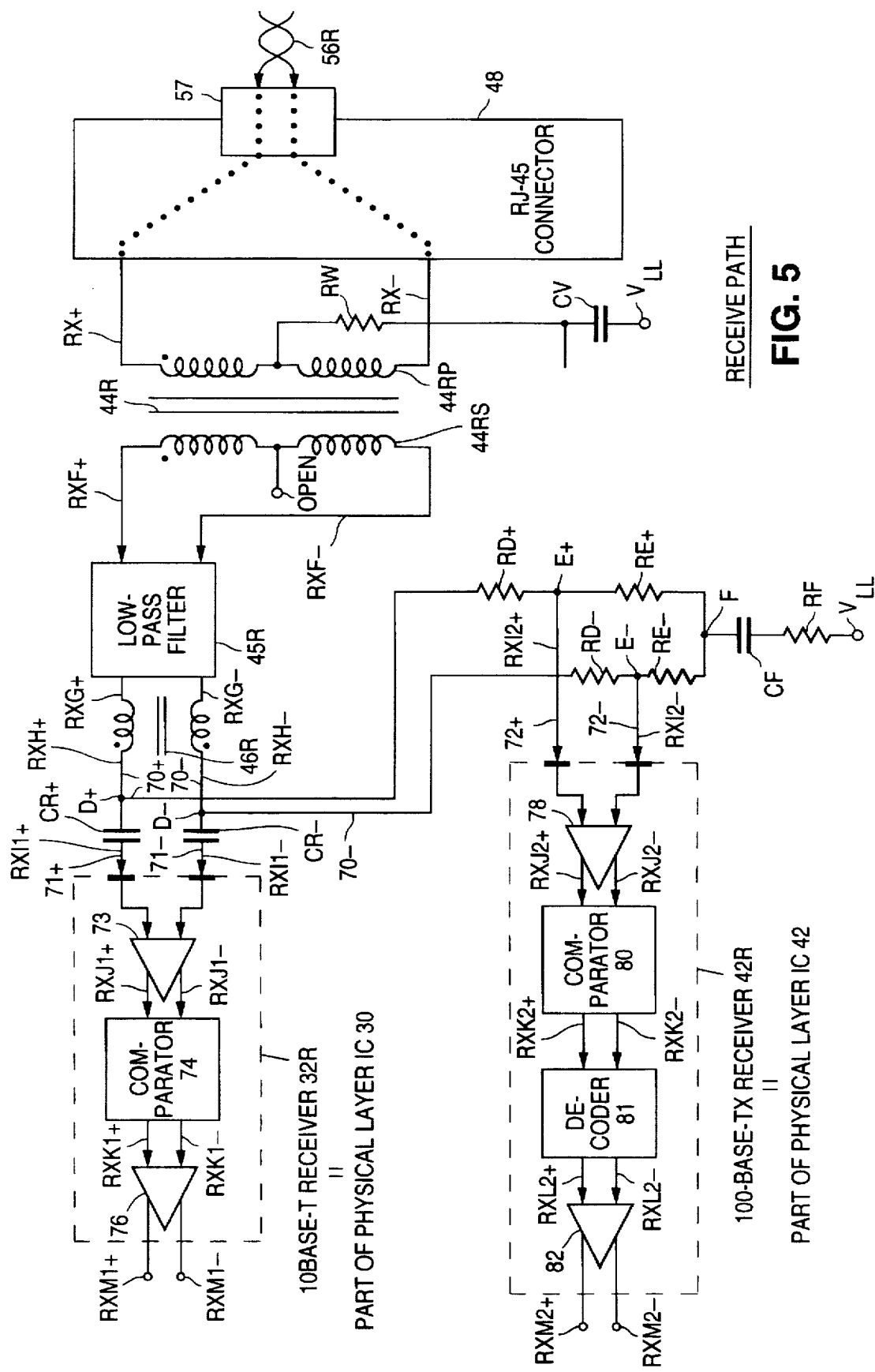
FIG. 5 is a block/circuit diagram of an embodiment of part of the differential data reception path for the interface apparatus in FIG. 2.

FIG. 5 depicts a preferred embodiment of part of the data reception path in the apparatus of FIG. 2. In particular, FIG. 5 illustrates details for the differential reception path section extending from incoming cable 56R to receivers 32R and 42R.

As indicated in FIG. 5, 10Base-T receiver 32R is preferably formed with an input buffer 73, a comparator 74, and an output buffer 76. Input buffer 73 presents a high input impedance and amplifies incoming signals RXI± to produce differential data signals RXJ1+ and RXJ1–. Comparator 74 determines whether data signals RXJ1± meet required minimum voltage requirements and provides corresponding differential data signals RXK1+ and RXK1–. Output buffer 76 amplifies signals RXK1± to produce data signals RXM1± for further signal processing according to the 10Base-T protocol.

100Base-TX receiver 42R is formed with an input buffer 78, a comparator 80, a decoder 81, and an output buffer 82. Input buffer 78 presents a high impedance and amplifies incoming signals RXI2±, which are NRZI and MLT-3 coded, to produce differential data signals RXJ2+ and RXJ2–. Comparator 80 generates differential data signals RXK2+ and RXK2– by quantizing signals RXJ2±. Decoder 81 decodes trinary NRZI MLT-3 signals RXK2± to produce binary NRZI differential data signals RXL2+ and RXL2–. Buffer 82 amplifies signals RXL2± to generate signals RXM2± for further signal processing according to the 100Base-TX protocol.

The resistors and capacitors used in the interface transceiver apparatus of FIGS. 2, 4, and 5 preferably have the values given in the following table:

| Resistor (s) | Value | Capacitor (s) | Value |
| --- | --- | --- | --- |
| RC | 12.5Ω | CR± | 0.1μF |
| RB± | 50Ω | CF | 0.01μF |
| RD± | 10Ω | CV | 1nF |
| RE± | 40Ω | CG±, CH | 1nF |
| RF | 0Ω | | |
| RU, RW | 50Ω | | |

The input bias levels of receivers 32R and 42R respectively are 3.75 and 2.75 volts. Conductors 70± are microstrip lines.

Transceiver IC 42 preferably consists of the DP83223 Twister IC made by National Semiconductor. See "DP83223 TWISTER Twisted Pair FDDI Transceiver Device," preliminary data sheet, National Semiconductor, July, 1993, pages 1–10, the contents of which are incorporated by reference herein. Transmit transformer 44T, transmit filter 45T, and choke 46T can be implemented with a single unit such as the Valor PT4171 10/100Base-TX and ATM Transformer Module product. The same applies to receive transformer 44R, receive filter 45R, and choke 46R.

Figure 6:
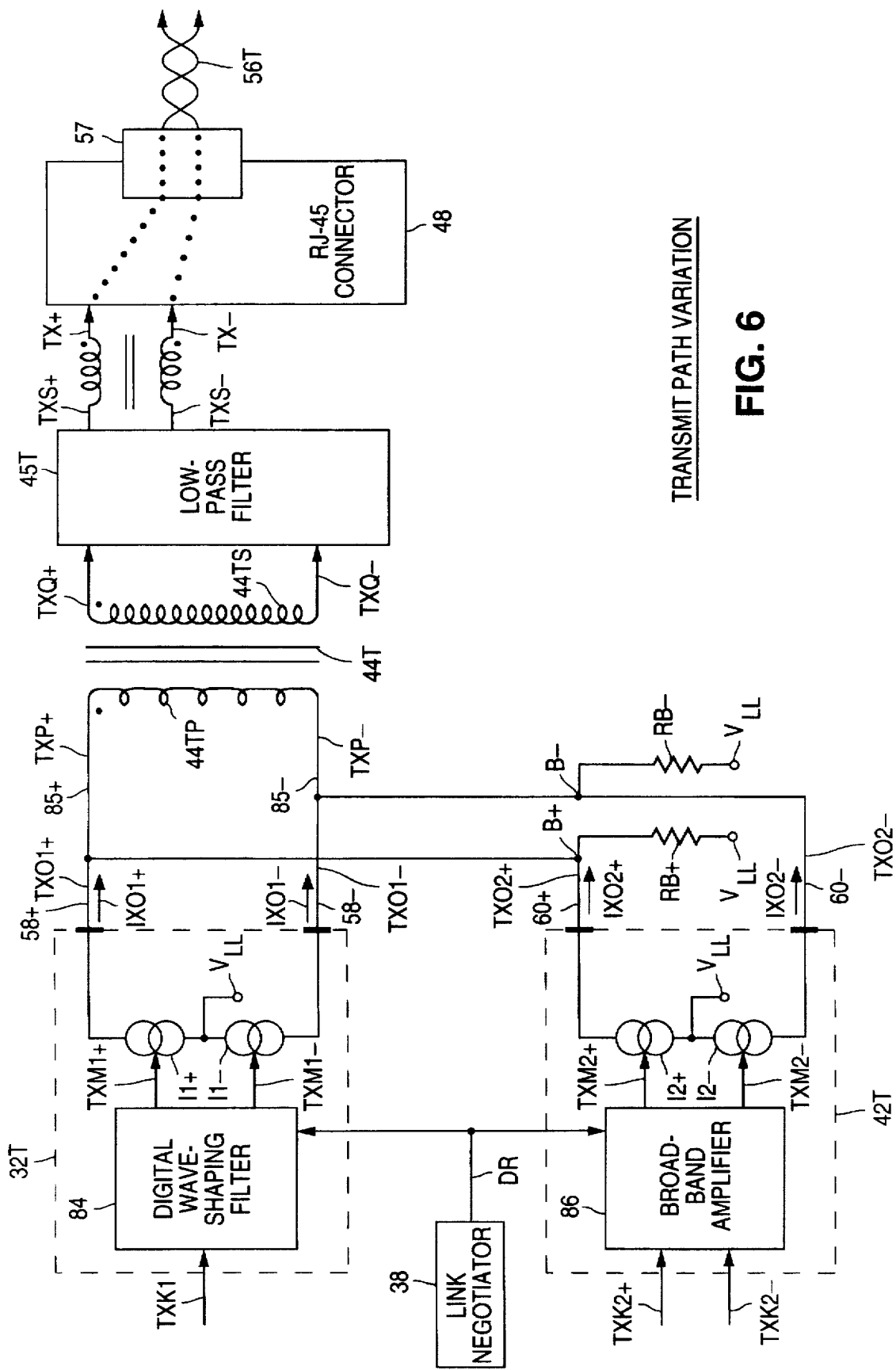
FIGS. 6 and 7 are block/circuit diagrams of an interface transmitter apparatus that meets the 10Base-T and 100Base-TX protocols in accordance with the invention. The transmitter apparatus of each of FIGS. 6 and 7 is a variation of the differential data transmission path in FIGS. 2 and 4.

Turning to FIG. 6, it illustrates a dual-rate interface transmitting apparatus that meets the 10Base-T and 100Base-TX protocols in transmitting data to outgoing twisted-pair cable 56T according to the teachings of the invention. The data transmitting apparatus of FIG. 6 employs the current-to-voltage conversion techniques of the invention for generating outgoing data at the 10Base-T rate and at the higher 100Base-TX rate. The apparatus of FIG. 6 provides a variation of the differential data transmission path of FIGS. 2 and 4. The circuitry that implements the differential data transmission path of FIG. 6 can be substituted for the corresponding data-transmission circuitry in FIGS. 2 and 4 to achieve a modified dual-rate interface transceiver apparatus for handling data according to the 10Base-T and 100Base-TX protocols.

In the transmission path of FIG. 6, the differential transmitting apparatus consists of 10Base-T transmitter 32T, 100Base-TX transmitter 42T, terminating resistors RB±, transmit transformer 44T, transmit low-pass filter 45T, transmit common-mode choke 46T, and RJ-45 connector 48, including plug 57. Components 42T, 44T, 45T, 46T, and 48 in the transmitting apparatus of FIG. 6 are interconnected and operable in the same way as in the transmitting apparatus of FIGS. 2 and 4, except that secondary winding 44TS of transformer 44T may have a different number of turns than primary winding 44TP. This affects the values of resistors RB± as explained further below.

The major difference between the data transmission path of FIG. 6 and that of FIGS. 2 and 4 occurs in 10Base-T transmitter 32T and in the associated connections of resistors RB±. Instead of providing voltage-sourced outgoing data signals from its TXO1±output terminals, transmitter 32T in FIG. 6 furnishes a pair of current-sourced differential outgoing data signals IXO1+ and IXO1− from the TXO1± terminals. During 10Base-T operation, outgoing current-sourced signals IXO1± are generated in a differential current-sourced format by applying digital filtering, including preemphasis, to Manchester-encoded data stream TXK1. For this purpose, 10Base-T transmitter 32T consists of a digital waveshaping filter 84 and a current-source transconductance amplifier circuit formed with a pair of equal-value voltage-controlled current sources I1+ and I1−.

During 10Base-T operation when data rate signal DR is high, waveshaping filter 84 digitally filters the TXK1 data stream to generate a pair of differential intermediate voltage-sourced data signals TXM1+ and TXM1− at 10 Mbps. Digital waveshaper 84 attenuates the frequency components above a cut-off frequency between 10 MHz and 20 MHz. The cut-off frequency of digital waveshaper 84 is typically 15 MHz, the same as in waveshaping filter 62 of FIGS. 2 and 4. Each of filtered Manchester-encoded intermediate signals TXM1± has a voltage swing determined by the transconductance gain of current sources I1±.

As with digital waveshaper 62, waveshaping filter 84 converts the Manchester-encoded TXK1 data stream into rounded shapes that conform to the 10Base-T voltage template during 10Base-T operation. Specifically, the portions of intermediate Manchester-encoded voltage data signals TXM1± corresponding to the 50-ns pulses in the TXK1 data stream are largely shaped as 10-MHz sine waves. The portions of outgoing data signals TXM1± corresponding to the 100-ns TXK1 pulses have substantially the same sine-wave shapes at the rising and falling signal edges, with preemphasis being applied to reduce inter-symbol jitter. In general, the shapes of intermediate data signals TXMI± are similar to those of outgoing data signals TXO1± illustrated in FIG. 3.

Digital waveshaper 84 filters the TXK1 data stream by applying digital waveshaping, including preemphasis, to the TXK1 pulses. Waveshaper 84 is preferably implemented as described in Segaram, U.S. Pat. No. 5,410,188, the contents of which are incorporated by reference herein.

Digital waveshaper 84 controls the generation of intermediate data signals TXM1± in response to data rate signal DR. When rate signal DR is high so that 10Base-T data transmission is being performed, the output buffer provides intermediate data signals TXM1± from waveshaper 84 so as to have the 10Base-T voltage templates described above. During 100Base-Tx operation in which signal DR is low, waveshaper 84 is disabled such that intermediate signals TXM1± are set at the same voltage. The voltage difference between signals TXM1± is zero. Consequently, currents IXO1± are zero.

Current source I1+, which operates as a transconductance amplifier controlled by the voltage of intermediate data signal TXM1+, is connected between outgoing conductor 58+ and the $V_{LL}$ supply. Similarly, current source I1−, which operates as a transconductance amplifier controlled by the voltage of intermediate data signal TXM1−, is connected between outgoing conductor 58− and the $V_{LL}$ supply.

Voltage-controlled current sources I1± respectively convert the voltages of intermediate data signals TXM1± into current-sourced outgoing data signals IXO1±. Letting $G_{M1}$ be the transconductance of each of (equal-size) voltage-controlled current sources I1±, current-sourced outgoing signal IXO+ is the product of transconductance $G_{M1}$ and the TXM1+ voltage. Current-sourced outgoing signal IXO1− is the product of $G_{M1}$ and the TXM1− voltage.

Current-sourced outgoing data signals IXO1± are supplied on outgoing conductors 58+ and 58− connected respectively through electrical conductors 85+ and 85− to the positive and negative ends of primary winding 44TP of transmit transformer 44T. Resistors RB±, which respectively terminate conductors 60± that extend from the TXO2± output terminals of 100Base-TX transmitter 42T, also respectively terminate conductors 58± in the apparatus of FIG. 6. Since both conductors 58± and conductors 60± are terminated by resistors RB±, there is no need for switches 54± used in the transmitting apparatus of FIGS. 2 and 4. Resistor RB+ is connected between the $V_{LL}$ supply and node B+ at one end of conductor 60+. Resistor RB− is similarly connected between the $V_{LL}$ supply and node B− at one end of conductor 60−.

During 10Base-T operation, currents IXO2± supplied on conductors 60± for 100Base-TX transmitter 42T are deselected and thus are approximately zero. Current-sourced outgoing data signals IXO1± vary in accordance with the Manchester-encoded TXK1 data stream. Outgoing data signals TXO1± for 10Base-T transmitter 32T are generated as impedance-produced voltage signals at nodes B± as a result of the voltages that currents IXO1± develop across resistors RB±. Impedance-produced voltage signals TXO1±, which contain data moving at 10 Mbps. have the digital filtering, including preemphasis, applied by waveshaping filter 84. Data signals TXP± supplied to primary winding 44TP then respectively equal impedance-produced outgoing voltage data signals TXO1±.

100Base-TX transmitter 42T in the transmitting apparatus of FIG. 6 consists of a broadband amplifier 86 and a current-source transconductance amplifier circuit formed with a pair of equal-sized voltage-controlled current sources I2+ and I2−. During 100Base-TX operation, broadband amplifier 86 applies amplification and MLT-3 coding to scrambled binary NRZI data signals TXK2± to produce trinary intermediate NRZI voltage data signals TXM2± at 125 Mbps. Broadband amplifier 86 is disabled such that intermediate data signals TXM2± are set at the same voltage during 10Base-T operation. As a result, currents IXO2± are zero. Amplifier 86 is internally formed with an encoder and an input buffer respectively that operate in the same way as encoder 67 and buffer 66 in transmitter 42T of FIG. 4. The encoder typically precedes the buffer in amplifier 86.

Current sources I2± operate as transconductance amplifiers respectively controlled by the voltages of intermediate data signals TXM2±. Voltage-controlled current source I2+ is connected between outgoing conductor 60+ and the $V_{LL}$ supply. Voltage-controlled current source I2− is similarly connected between outgoing conductor 60− and the $V_{LL}$ supply.

Current sources I2±, which together correspond to output current driver 68 in FIG. 4, respectively convert the voltages of intermediate scrambled NRZI MLT-3 coded data signals TXM2± into current-sourced outgoing data signals IXO2± supplied on lines 60±. Letting $G_{M2}$ be the transconductance of each of (equal-size) current sources I2±, current-sourced outgoing data signal IXO2+ is the product of $G_{M2}$ and the TXM2+ voltage. Current-sourced outgoing data signal IXO2− is similarly the product of $G_{M2}$ and the TXM2− voltage.

During 100Base-TX operation in which data rate signal DR is low, currents IXO1± from 10Base-TX transmitter 32T are deselected and thus are approximately zero. Current-sourced data signals IXO2± vary in accordance with scrambled NRZI MLT-3 data signals TXK2±. The voltages that currents IXO2± develop across resistors RB+ cause outgoing impedance-produced voltage data signals TXO2± to be respectively supplied on conductors 60± for 100Base-TX transmitter 42T. Data signals TXO2± move at 125 Mbps with scrambled NRZI and MLT-3 coding typically at a 2-volt peak-to-peak swing. Input signals TXP± to primary winding 44TP then respectively equal impedance-produced outgoing voltage data signals TXO2±.

Terminating resistors RB± provide a resistance that matches the impedance of outgoing twisted-pair cable 56T during both 10Base-T and 100Base-TX operation. The values of resistors RB± affect the impedance-produced voltage swings of both outgoing data signals TXO1± and outgoing data signals TXO2±, and thus the voltage swings of signals TXP±. Let the turns ratio of secondary winding 44TS to primary winding 44TP be represented as N. Each of resistors RB± then has a resistance $R_B$ given as:

$$R_B = Z_T / 2N^2 \quad (1)$$

where $Z_T$ is the approximiate 100-ohm impedance of outgoing cable 56T. For the typical case in which N equals 1, resistance $R_B$ is approximately 50 ohms.

By configuring 10Base-T transmitter 32T to furnish current-sourced outgoing data signals IXO1± and then using terminating resistors RB± to convert current-sourced signals IXO1± into impedance-produced voltage signals TXO1±, the transmitting data path of FIG. 6 is simpler than that of FIGS. 2 and 4. Both conductors 58± and conductors 60± are terminated with the same impedance elements, thereby eliminating source terminating resistors RA± in the apparatus of FIGS. 2 and 4 along with switches 54±, balancing resistor RC, balancing capacitor CC, and pole-zero cancellation capacitors CG± and CH (shown only in FIG. 4).

Figure 7:
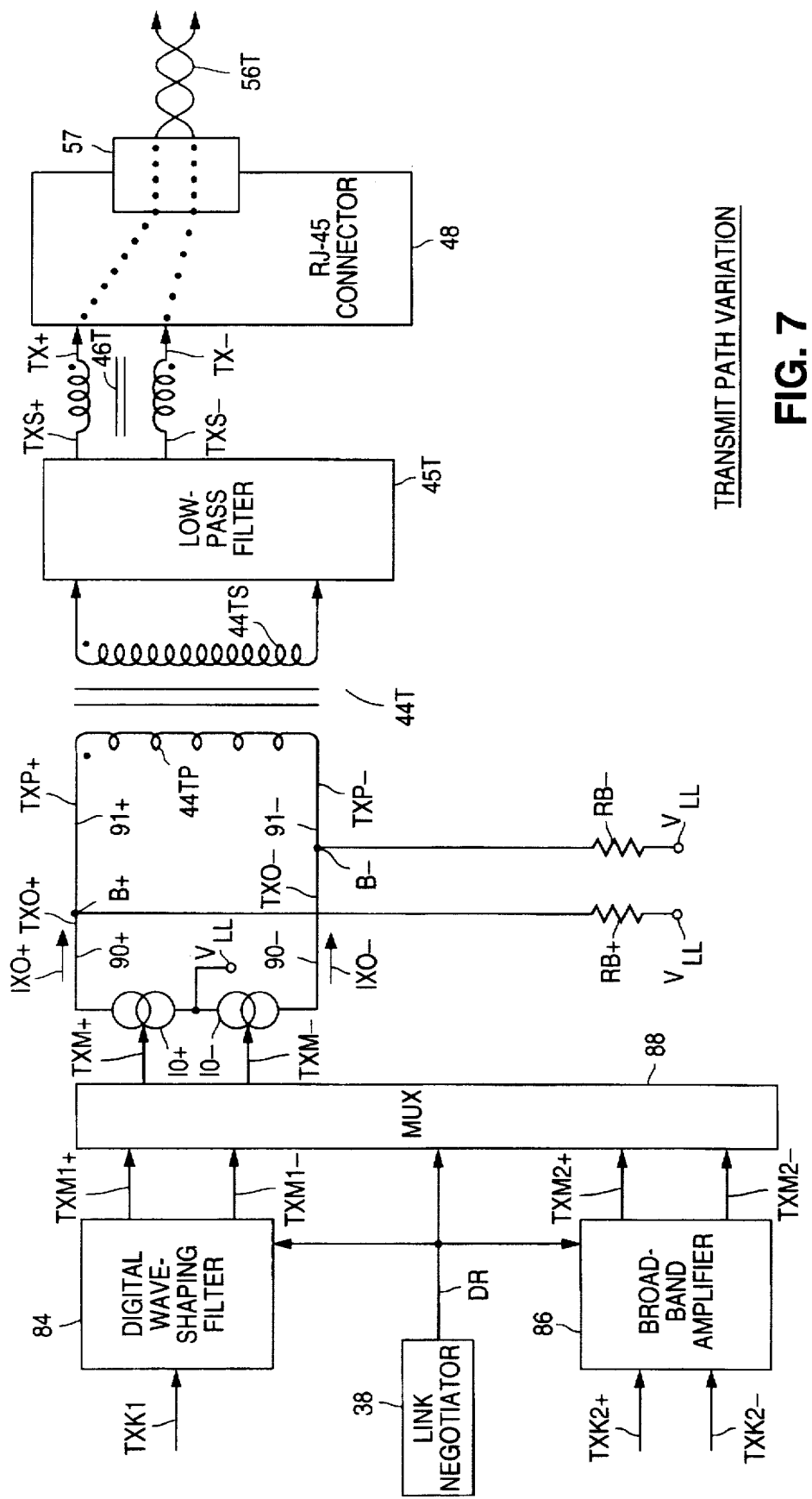

FIG. 7 depicts another dual-rate interface transmitting apparatus that applies the current-to-voltage conversion techniques of the invention in transmitting outgoing data to cable 56T according to the 10Base-T and 100Base-TX protocols. The transmitting apparatus of FIG. 7 is configured similarly to that of FIG. 6 except that multiplexing is used to compress the circuitry needed to perform the current-to-voltage operations of the invention.

As with the transmitting apparatus of FIG. 6, the transmitting apparatus of FIG. 7 provides a variation of the differential data transmission path of FIGS. 2 and 4. Likewise, the circuitry that implements the data transmission path of FIG. 7 can be substituted for the corresponding data transmission circuitry in FIGS. 2 and 4 to achieve a modified dual-rate interface transceiver apparatus for handling data according to the 10Base-T and 100Base-TX protocols.

In FIG. 7, the transmitting apparatus contains link negotiator 38, digital waveshaping filter 84, broadband amplifier 86, resistors RB±, transformer 44T, low-pass filter 45T, choke 46T, and RJ-45 connector 48, again including plug 57. Components 44T, 45T, 46T, and 48 are interconnected and operable as specified above. Digital waveshaper 84 generates intermediate voltage data signals TXM1± in response to the TXK1 Manchester-encoded data stream in the manner described above for the apparatus of FIG. 6. In response to scrambled NRZI signals TXK2±, broadband amplifier 86 likewise produces intermediate data signals TXM2± as provided above for the apparatus of FIG. 6.

The transmitting apparatus of FIG. 7 further includes a multiplexer 88 and a current-source transconductance amplifier circuit formed with a pair of equal-value voltage-controlled current sources IO+ and IO−. Multiplexer 88 selects either intermediate data signals TXM1± or intermediate data signals TXM2± and provides a pair of further intermediate voltage-sourced data signals TXM+ and TXM− as the selected pair of data signals. When data rate signal DR is high, further intermediate data signals TXM± respectively constitute signals TXM1± for 10Base-T operation. When data rate signal DR is low, intermediate data signals TXM± respectively constitute signals TXM2± for 100Base-TX operation.

Voltage-controlled current sources IO+ are, as shown in FIG. 7, arranged in the same way as voltage-controlled current sources I1± in FIG. 6. Current sources IO± respectively convert the voltages of intermediate data signals TXM± into a pair of outgoing current-sourced signals IXO+ and IXO−. Letting $G_{MO}$ be the transconductance of each of (equal-size) current sources IO±, current-sourced outgoing data signal IXO+ is the product of $G_{MO}$ and the TXM+ voltage. Current-sourced outgoing data signal IXO− is likewise the product of $G_{MO}$ and the TXM− voltage.

Currents IXO± are provided on a pair of outgoing electrical conductors 90+ and 90− connected respectively through electrical conductors 91+ and 91− to the positive and negative ends of primary winding 44TP. Conductors 90± and 91± are terminated respectively by resistors RB±, again connected directly to the $V_{LL}$ supply. As in FIG. 7, resistors RB± provide a resistance that matches the 100-ohm characteristic impedance of outgoing cable 56T. Resistance $R_B$ of each of resistors RB± is again determined by Eq. 1, where N is the secondary-to-primary turns ratio of transmit transformer 44T.

Current-sourced outgoing signals IXO± vary either with intermediate signals TXM1± or with intermediate signals TXM2± depending on the value of data rate signal DR. Currents IXO± develop voltages across resistors RB±, thereby respectively generating impedance-produced outgoing voltage data signals TXP± at nodes B±. During 10Base-T operation when data rate signal DR is high, signals TXP± thus are digitally filtered Manchester-encoded signals moving at 10 Mbps. Signals TXP± are scrambled NRZI MLT-3 coded signals moving at 125 Mbps during 100Base-Tx operation when rate signal DR is low.

As with the apparatus of FIG. 6, the interface between the impedance circuitry (RB±) and the directly preceding circuitry is very simple in the apparatus of FIG. 7. Source terminating resistors RA± in the apparatus of FIGS. 2 and 4 are again eliminated, along with switches 54±, balancing resistor RC, balancing capacitor CC, and pole-zero cancellation capacitors CG± and CH (shown only in FIG. 4). Furthermore, paired voltage-controlled current sources typically occupy more IC chip area than multiplexer 88. Consequently, the transmitter circuitry in the apparatus of FIG. 7 occupies less chip area then in FIG. 6. While the transistor circuitry of FIG. 7 can be implemented as one or more integrated circuits depending on design requirements, the apparatus of FIG. 7 is particularly suitable for being manufactured as a single monolithic integrated circuit.

Figure 8:
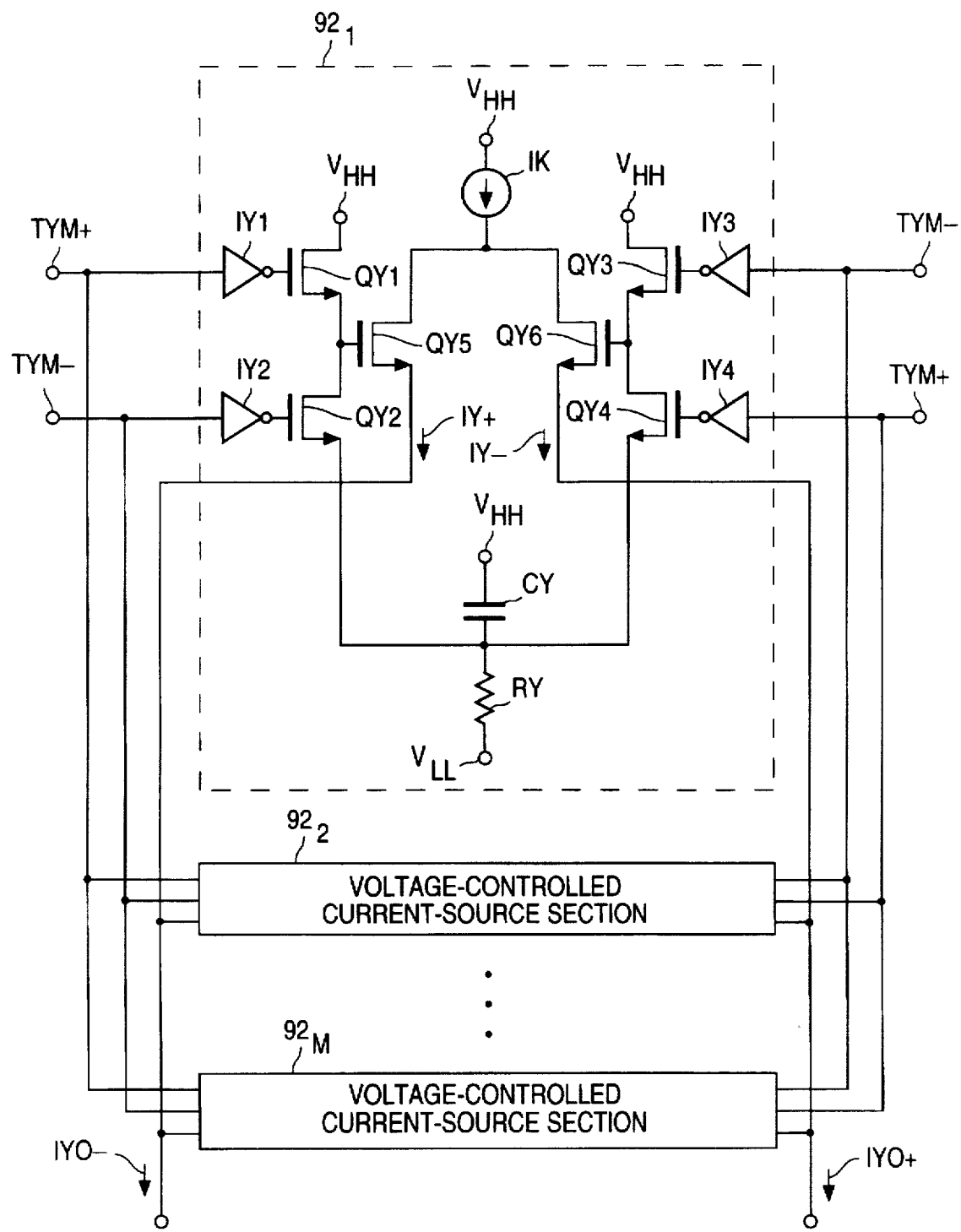
FIG. 8 is a circuit diagram of an implementation of each of the paired voltage-controlled current sources in the differential interface transmitter apparatus of FIG. 6 or 7.

FIG. 8 depicts a typical implementation for each of voltage-controlled current-source pairs I0±, I1±, and I2±. Each pair of voltage-controlled current sources I0±, I1±, or I2± consists of M replications $92_1$, $92_2$, ... $92_M$ of the circuitry contained in voltage-controlled current-source section $92_1$. M is typically 32. Voltage-controlled current-source sections $92_1$–$92_M$ are connected in parallel.

Voltage-controlled current-source section $92_1$ is formed with four input inverters IY1, IY2, IY3, and IY4, six N-channel enhancement-mode insulated-gate field-effect transistors QY1, QY2, QY3, QY4, QY5, and QY6, a capacitor CY, a resistor RY, and a constant current source IK arranged as shown in FIG. 8. Output current signals IY+ and IY− are provided from output transistors QY5 and QY6 in response to input voltage signals TYM+ and TYM− provided to input inverters IY1–IY4. Voltage-controlled current-source section $92_1$ operates in a differential manner such that the sum of currents IY+ and IY− equals the constant current provided by current source IK. Further information on the operation of current-source section $92_1$ is given in Polhemus, U.S. Pat. No. 5,444,410, the contents of which are incorporated by reference herein.

In response to commonly supplied input voltages TYM±, voltage-controlled current-source sections $92_1$–$92_M$ provide composite output current signals IYO+ and IYO−. Output current IYO+ is the sum of the M contributing currents IY+. Output current IYO− similarly is the sum of the M contributing currents IY−. Input voltages TYM± in FIG. 8 correspond to intermediate voltage signals TXM1±, TXM2±, or TXM± in FIG. 6 or 7. Similarly, output currents IYO± correspond to current-sourced outgoing signals IXO1±, IXO2±, or IXO± in FIG. 6 or 7.

The interface apparatus of FIGS. 2, 5, and 6 or 7 preferably includes a capability for handling data transmissible over fiber optical cables in accordance with the ANSI X3T12 standard commonly referred to as FDDI (fiber distributed data interface). The FDDI standard prescribes a data transfer rate of 100 Mbps. However, certain control signals are incorporated into the FDDI data stream before it is furnished to an optical cable. As a result, the FDDI cable data transfer rate is 125 Mbps. In fact, the FDDI data-stream specifications are incorporated into the 100Base-TX protocol.

FDDI data utilizes the 100Base-TX transmit and receive data paths in the apparatus of FIGS. 2, 5, and 6 or 7. However, the FDDI processing is slightly different from the normal 100Base-TX twisted-pair processing. NRZI coding is used in place of MLT-3 coding to reduce EMI. Also, data scrambling is not employed with FDDI.

Figure 9:
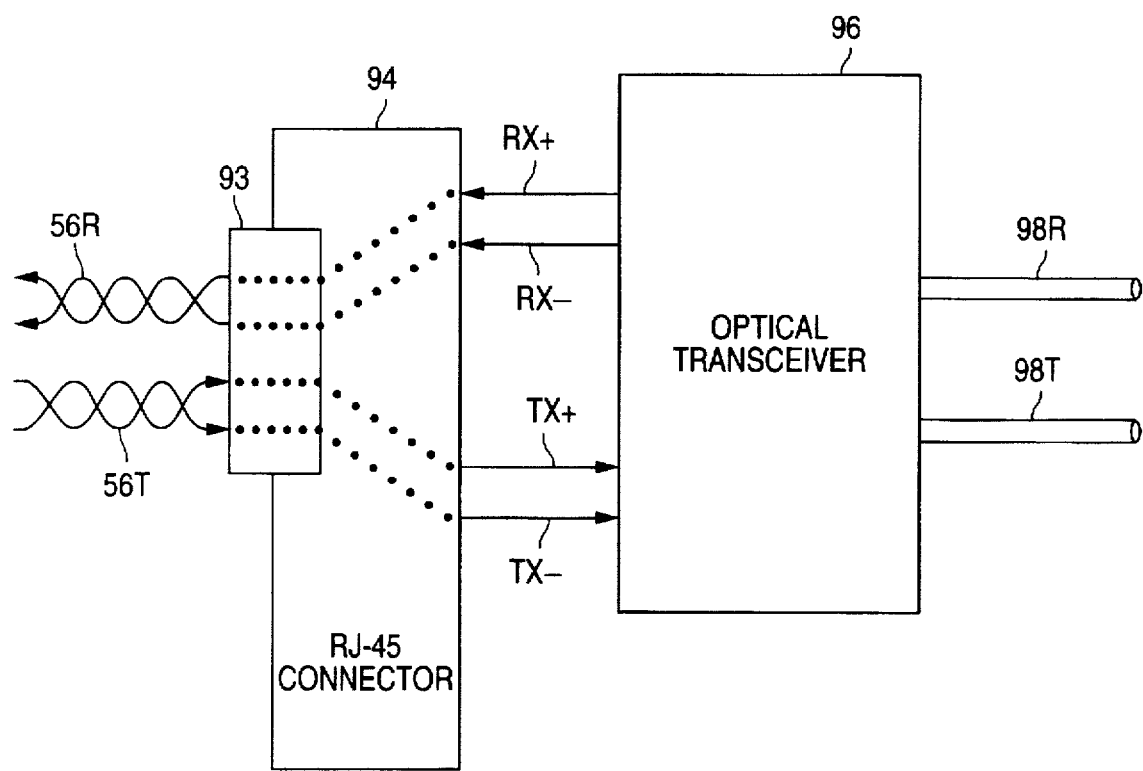
FIG. 9 is a block diagram of an optical transceiver apparatus employable with the interface transceiver apparatus of FIG. 2 as modified by the data transmission path circuitry of FIG. 6 or 7 in accordance with the invention.

FIG. 9 illustrates an example of how the interface apparatus of FIGS. 2, 5, and 6 or 7 is augmented to utilize the FDDI capability. The remote ends of twisted-pair copper cables 56T and 56R in the apparatus of FIGS. 2, 5, and 6 or 7 terminate in a plug 93 insertable into an RJ-45 connector 94 situated at the edge of a translator board (not shown). RJ-45 connector is connected to an optical transceiver 96 located on the translator board. Optical transceiver 96 is further connected to an outgoing optical cable 98T and an incoming optical cable 98R.

Optical transceiver 96 contains an optical transmitter portion (not separately shown) and an optical receiver portion (also not separately shown). During data transmission, the optical transmitter portion converts differential signals TX± from cable 56T into an optical signal which is transmitted through outgoing optical cable 98T to the remote equipment. The opposite occurs during data reception. The optical receiver portion converts an optical signal received from the remote equipment on incoming optical cable 98R into differential signals RX± which are supplied to cable 56R.

In the preceding way, the composite interface apparatus of FIGS. 2, 5, 9, and 6 or 7 transmits and receives FDDI data moving along optical cables 98T and 9SR at the 100Base-TX cable rate of 125 Mbps. The composite interface apparatus can also handle data moving at 10 Mbps in accordance with the 10Base-T protocol.

The generation of complementary data signals could be converted to single-ended signal generation up to transmit transformer 44T in the transmission data paths of each of FIGS. 6 and 7 and also in the transmission data path of FIGS. 2 and 4. For example, the components and data signals identified with "−" (minus) signs could be deleted up to transformer 44T. Only the data signals identified with "+" (plus) signs would be employed in the resulting transmission data paths up to transformer 44T. Alternatively, the conductors carrying signals identified with "−" signs could be connected to ground or another low-impedance source of a constant voltage.

Figure 10:
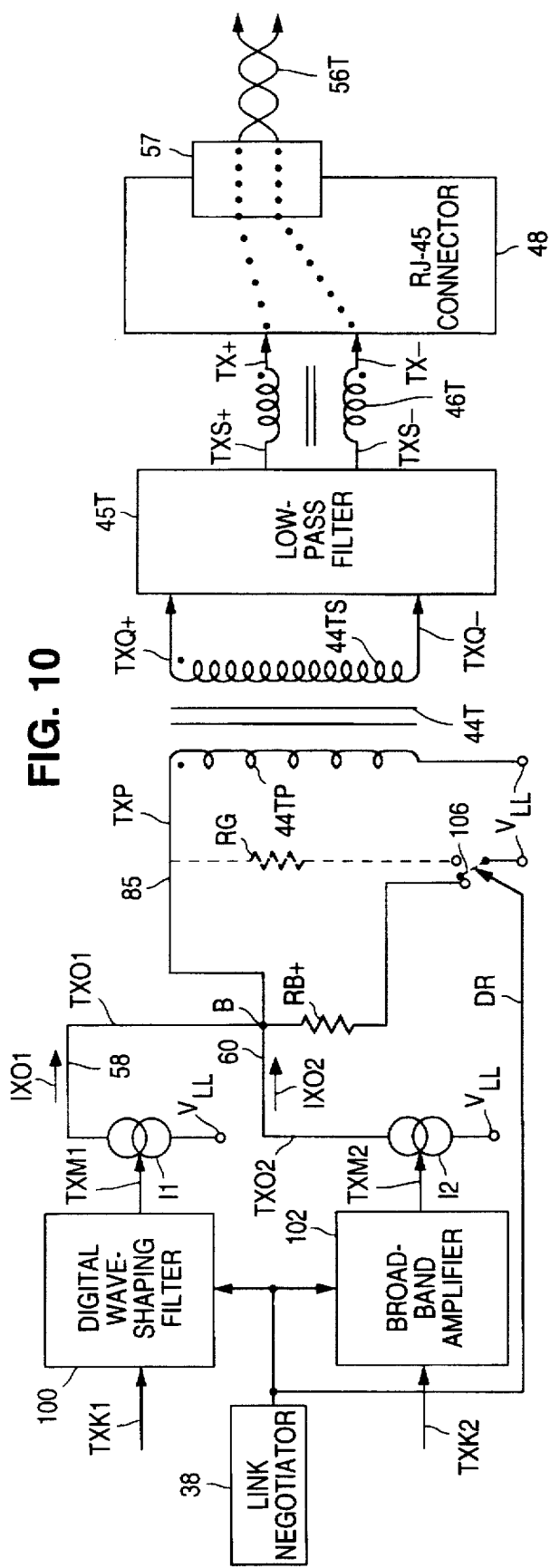
FIGS. 10 and 11 are block/circuit diagrams of nondifferential (single-ended) variations of the respective differential interface transmitter apparatuses of FIGS. 6 and 7.
Figure 11:
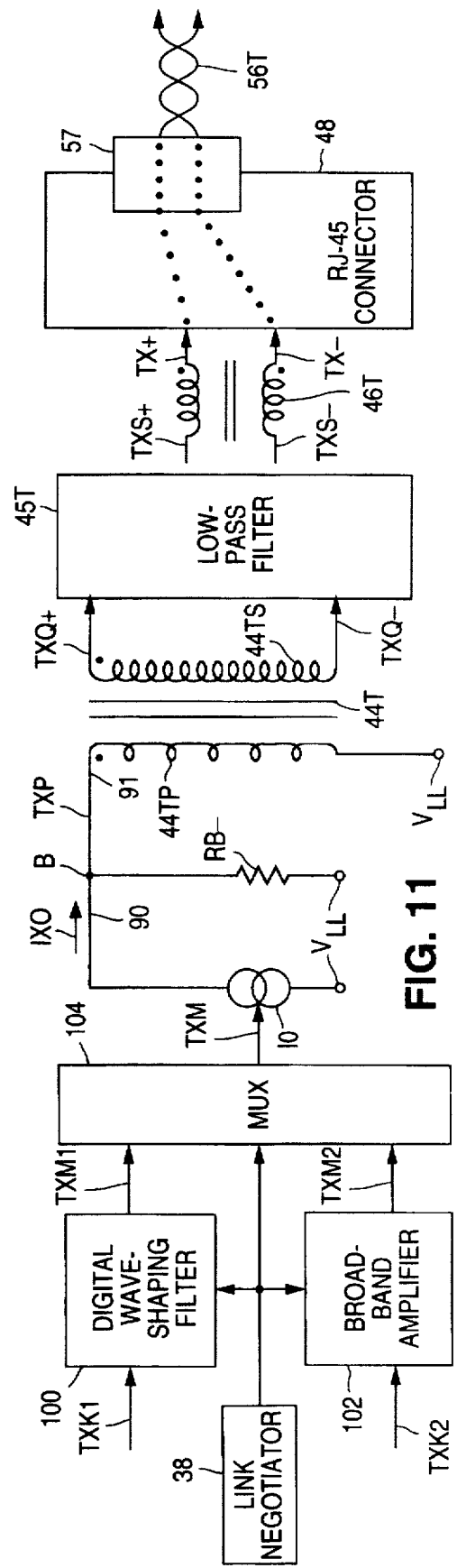

FIGS. 10 and 11 respectively illustrate variations of the interface transmitting apparatuses of FIGS. 6 and 7 in which such complementary-to-single-ended changes have been made. The transmitting apparatus of each of FIGS. 10 and 11 contains link negotiator 38, a digital waveshaping filter 100, a broadband amplifier 102, a terminating resistor RB, transformer 44T, low-pass filter 45T, common-mode choke 46T, and RJ-45 connector 48, including plug 57. The apparatus of FIG. 10 further includes a current-source transconductance amplifier circuit consisting of voltage-controlled current sources I1 and I2. The apparatus of FIG. 11 further includes a multiplexer 104 and a current-source transconductance amplifier circuit formed with a single voltage-controlled current source I0.

Components 38, 100, 102, I1, I2, and RB in the apparatus of FIG. 10 are connected and operable in the same way as components 38, 84, 86, I1+, I2+, and RB+ in the apparatus of FIG. 6, subject to deletion of the associated signals identified with "−" signs and dropping the "+" signs in the associated signals and lines identified with "+" signs. Components 38, 100, 102, 104, IO, and RB in the apparatus of FIG. 11 are likewise interconnected and operable in the same manner as components 38, 84, 86, 88, IO+, and RB in the apparatus of FIG. 7, subject to deletion of the associated signals identified with "−" signs and dropping the "+" signs in the associated signals and lines identified with "+" signs. Node B+ in FIG. 6 and 7 becomes node B in FIGS. 10 and 11. Components 44T, 45T, 46T, and 48 in the apparatuses of FIGS. 10 and 11 are interconnected and operable in the same manner as in the apparatuses of FIG. 6 and 7, except that the negative end of transformer 44T is connected to the $V_{LL}$ supply.

Voltage-controlled current sources I1 and I2 in the apparatus of FIG. 10 normally have characteristics that enable outgoing data signals TX± to have desired, typically different, voltage swings during 10Base-T and 100Base-TX operation using only terminating resistor RB for current-to-voltage conversion. In some cases, it may be difficult to arrange for voltage-controlled current sources I1 and I2 to have such characteristics. If so, the apparatus of FIG. 10 can be provided with a further terminating resistor RG and a two-position switch 106 as shown in dashed line in FIG. 10. Data rate signal DR controls switch 106.

During 10Base-T operation with rate signal DR high, switch 106 connects resistor RB to the $V_{LL}$ supply and disables resistor RG. Resistor RB then terminates conductors 58 and 85 to set the voltage swing for data signal TXP and thus the 10Base-T voltage swing for data signals TX±. During 100Base-TX operation when signal DR is low, switch 106 connects resistor RG to the $V_{LL}$ supply and disables resistor RB. Resistor RG then terminates conductors 60 and 85, thereby setting the 100Base-TX voltage swing for data signals TX±.

Conductors 58 and 60 could be tapped at different points on primary winding 44TP of transformer 44T in the apparatus of FIG. 10. Because the turns ratio of transformer 44T would change in switching between 10Base-T and 100Base-TX operation, resistor RG would typically be needed to provide proper termination to account for the turns ratio difference. Node B would then be divided into two nodes, one for resistor RB, and the other for resistor RG. Primary winding 44TP could be provided with a centertap to which conductor 58 or 60 is connected.

Modifications of a similar nature to those described in the preceding two paragraphs could be made to the apparatus of FIG. 11. Likewise, similar modifications could be made to the differential apparatuses of FIGS. 6 and 7. Primary winding 44TP of transformer 44T could, for example, be provided with a pair of symmetrically located intermediate taps for respective connection to conductors 58± or conductors 60±. Although such modifications slightly increase the complexity and amount of circuitry needed, they provide enhanced flexibility. When such modifications are employed, the data-transmitting circuitry in the apparatuses of FIGS. 6 and 7, as well as FIGS. 10 and 11, can still be readily manufactured as a single integrated circuit.

While the invention has been described with reference to particular embodiments, this description is solely for the purpose of illustration and is not to be construed as limiting the scope of the invention claimed below. For example, at least one of the two data transfer rates could differ from the 10Base-T and 100Base-TX data transfer rates. The present interface apparatus could be part of a larger interface apparatus that handles data moving at any of three or more different data transfer rates and protocols.

If the incoming signals representing the received data at the lower (rather than higher) data rate need attenuation, the data reception path could go from receive transformer 44R to 100Base-TX receiver 42 and then in a non-interruptible daisy chain manner to 10Base-T receiver 32. Blocking capacitors CR± could be moved down to the inputs of 100Base-TX receiver 42R. With suitable rearrangement of the DC input bias networks in receivers 32R and 42R, capacitors CR± in the 10Base-T receive path could even be deleted.

Link negotiator 38 could be replaced with circuitry that simply detects whether data is being transferred at 10 or 100 Mbps and generates a data rate signal at a corresponding value. Instead of filtering the 100Base-TX data with low-pass filter 45T situated in the secondary winding of transmit transformer 44T, frequency components above the 62.5-MHz characteristic data rate frequency of the 100Base-TX cable data could be attenuated with a suitable low-pass filter situated elsewhere in the 100Base-TX data path.

Current sources I1± and I2±, while having been described as transconductance amplifiers in the differential transmitting apparatus of FIGS. 6 and 7, could be termed transadmittance amplifiers, particularly when the voltage-to-current conversion is determined by complex impedance rather than just resistance. The same applies to current sources I1, I2, and IO in the single-ended transmitting apparatuses of FIGS. 10 and 11.

Instead of being controlled by the voltages of intermediate data signals TXM1± and TXM2± in the differential apparatuses of FIGS. 6 and 7, current sources I1± and I2± could be controlled by the currents of signals TXM1± and TXM2±. Current sources I1± and I2± then function as current amplifiers. Likewise, current sources I1, I2, and I0 in the single-ended apparatuses of FIGS. 10 and 11 could be current amplifiers controlled by the currents of intermediate data signals TXM1 and TXM2. Various modifications and applications may thus be made by those skilled in the art without departing from the true scope and spirit of the invention as defined in the appended claims.

I claim:

1. An electronic apparatus comprising:
   an isolation transformer having a primary winding and a secondary winding;
   transmitter circuitry (a) for low-pass filtering digital data to produce first outgoing data which the transmitter circuitry transmits to the primary winding largely at a first data transfer rate and (b) for transmitting second outgoing data to the primary winding largely at a second data transfer rate different from the first data rate, the transmitter circuitry being operable to generate current-sourced data signals at both data rates and then to convert the current-sourced signals into impedance-produced voltage signals that comprise the outgoing data; and
   a cable connection mechanism for providing outgoing data from the secondary winding to a communication cable.

2. Apparatus as in claim 1 wherein the second data rate is greater than the first data rate.

3. Apparatus as in claim 2 wherein the transmitter circuitry contains a digital waveshaper that at least partially provides the low-pass filtering of the first outgoing data.

4. Apparatus as in claim 2 further including a transmit filter that low-pass filters the second outgoing data at a frequency bandwidth greater than that at which the first outgoing data is low-pass filtered in the transmitter circuitry.

5. Apparatus as in claim 4 wherein the transformer is electronically coupled through the transmit filter to the cable connection mechanism.

6. Apparatus as in claim 2 wherein the transmitter circuitry comprises:
- a digital waveshaper that furnishes at least one first intermediate data signal, the waveshaper at least partially providing the low-pass filtering of the first outgoing data;
- an amplifier that furnishes at least one second intermediate data signal;
- composite current-source amplifier circuitry for converting the first and second intermediate signals respectively into first and second ones of the current-sourced signals; and
- impedance circuitry for converting the first and second current-sourced signals respectively into the first and second outgoing data.

7. Apparatus as in claim 6 wherein the composite current-source amplifier circuitry comprises circuitry that converts voltages of the first and second intermediate signals respectively into the first and second current-sourced signals.

8. Apparatus as in claim 6 wherein the composite current-source amplifier circuitry comprises:
- first current-source means responsive to each first intermediate signal for providing each first current-sourced signal to the impedance circuitry; and
- second current-source means responsive to each second intermediate signal for providing each second current-sourced signal to the impedance circuitry.

9. Apparatus as in claim 6 wherein the composite current-source amplifier circuitry comprises:
- a multiplexer for selectably providing at least one further intermediate data signal that comprises either each first intermediate data signal or each second intermediate data signal; and
- current-source means responsive to each further intermediate data signal for providing the impedance circuitry with each first current-sourced signal or each second current-sourced signal.

10. Apparatus as in claim 6 wherein the composite current-source amplifier circuitry comprises circuitry that converts currents of the first and second intermediate signals respectively into the first and second current-sourced signals.

11. An electronic apparatus comprising:
- a transmit isolation transformer having a primary winding and a secondary winding;
- a receive isolation transformer having a primary winding and a secondary winding;
- a cable connection mechanism for (a) providing outgoing data from the secondary winding of the transmit transformer to a cable means and (b) for providing incoming data from the cable means to the primary winding of the receive transformer;
- transceiver circuitry (a) for low-pass filtering digital data to produce first outgoing data which the transceiver circuitry transmits to the primary winding of the transmit transformer largely at a first data transfer rate, (b) for transmitting second outgoing data to the primary winding of the transmit transformer largely at a second data transfer rate different from the first data rate, and (c) for receiving incoming data from the secondary winding of the receive transformer largely at each of the data rates, the transceiver circuitry being operable to generate current-sourced data signals at both data rates and then to convert the current-sourced signals into impedance-produced voltage signals that comprise the outgoing data, incoming data from the secondary winding of the receive transformer being provided along data transfer paths that extend from the secondary winding of the receive transformer through where the transceiver circuitry physically receives incoming data at one of the data rates for substantive processing to where the transceiver circuitry physically receives incoming data at the other data rate for substantive processing, the data transfer paths having a characteristic impedance that is largely constant during normal apparatus operation.

12. Apparatus as in claim 11 wherein the second data rate is greater than the first data rate.

13. An electronic apparatus comprising:
- an isolation transformer having a primary winding and a secondary winding;
- a cable connection mechanism electronically coupled to the secondary winding and connectable to a pair of lines of a twisted-pair cable so as to electronically couple the twisted-pair cable to the secondary winding; and
- transmitter circuitry (a) for low-pass filtering digital data to produce first outgoing data which the transmitter circuitry differentially transmits to the primary winding largely at a first data transfer rate and (b) for differentially transmitting second outgoing data to the primary winding largely at a second data transfer rate different from the first data rate, the transmitter circuitry being operable to generate current-sourced data signals at each of the data rates and then to convert the current-sourced signals into impedance-produced voltage signals that comprise the outgoing data.

14. Apparatus as in claim 13 wherein the second data rate is greater than the first data rate.

15. Apparatus as in claim 14 wherein the transmitter circuitry contains a digital waveshaper that at least partially provides the low-pass filtering of the first outgoing data.

16. Apparatus as in claim 14 further including a transmit filter that low-pass filters the second outgoing data at a frequency bandwidth greater than that at which the first outgoing data is low-pass filtered in the transmitter circuitry.

17. Apparatus as in claim 16 wherein the transformer is electronically coupled through the transmit filter to the cable connection mechanism.

18. Apparatus as in claim 14 wherein the transmitter circuitry comprises:
- a digital waveshaper that furnishes first intermediate data signals, the waveshaper at least partially providing the low-pass filtering of the first outgoing data;
- an amplifier that furnishes second intermediate data signals;
- composite current-source amplifier circuitry for converting the first and second intermediate signals respectively into first and second ones of the current-sourced signals; and
- impedance circuitry for converting the first and second current-sourced signals respectively into the first and second outgoing data.

19. Apparatus as in claim 18 wherein the composite current-source amplifier circuitry comprises circuitry that converts voltages of the first and second intermediate signals respectively into the first and second current-sourced signals.

20. Apparatus as in claim 18 wherein the composite current-source amplifier circuitry comprises:

first current-source means responsive to the first intermediate signals for providing the first current-sourced signals to the impedance circuitry; and second current-source means responsive to the second intermediate signals for providing the second current-sourced signals to the impedance circuitry.

21. Apparatus as in claim 20 wherein each of the current-source means comprises a pair of current sources.

22. Apparatus as in claim 21 wherein each current source is voltage controlled.

23. Apparatus as in claim 21 wherein each current source is current controlled.

24. Apparatus as in claim 18 wherein the composite current-source circuitry comprises:

a multiplexer for selectably providing further intermediate data signals that comprise either the first intermediate data signals or the second intermediate data signals; and current-source means responsive to the further intermediate data signals for providing the impedance circuitry with the first current-sourced signals or the second current-sourced signals.

25. Apparatus as in claim 24 wherein the current-source means comprises a pair of current sources.

26. Apparatus as in claim 25 wherein each current source is voltage controlled.

27. Apparatus as in claim 25 wherein each current source is current controlled.

28. Apparatus as in claim 18 wherein the impedance circuitry comprises a pair of impedance elements, a pair of electrical conductors extending from the composite current-source circuitry to the primary winding, each impedance element coupled between a source of a common reference voltage and a corresponding one of electrical conductors.

29. Apparatus as in claim 28 wherein each impedance element comprises a resistor.

30. Apparatus as in claim 18 wherein the composite current-source amplifier circuitry comprises circuitry that converts currents of the first and second intermediate signals respectively into the first and second current-sourced signals.

31. Apparatus as in claim 14 wherein:

the first outgoing data has a first characteristic data rate frequency; and the second outgoing data rate has a second characteristic data rate frequency greater than the first characteristic data rate frequency.

32. Apparatus as in claim 31 wherein:

the low-pass filtering of the first outgoing data is done at a low-pass cut-off frequency in the range extending between the characteristic data rate frequencies; and the apparatus includes a filter that low-pass filters the second outgoing data at a low-pass cut-off frequency greater than or equal to the second characteristic data rate frequency.

33. Apparatus as in claim 14 further including rate circuitry that determines whether outgoing data is to be transmitted at the first data rate or at the second data rate and generates a corresponding data rate signal.

34. Apparatus as in claim 14 further including:

a first transmit state machine that performs state functions on digital data to produce data supplied at the first data rate to the transmitter circuitry;

a second transmit state machine that performs state functions on digital data to produce data supplied at the second data rate to the transmitter circuitry; and selection circuitry that selectively passes digital data either to the first state machine or to the second state machine.

35. Apparatus as in claim 14 wherein the first and second outgoing data are transmitted respectively in accordance with the 10Base-T and 100Base-TX protocols.

36. Apparatus as in claim 14 further including:

a further isolation transformer having a further primary winding and a further secondary winding, the cable connection mechanism being electronically coupled to the further primary winding and connectable to a pair of lines of a further twisted-pair cable so as to electronically couple the further twisted-pair cable to the further primary winding; and receiver circuitry for differentially receiving incoming data from the further secondary winding largely at each of the data rates.

37. An electronic apparatus comprising:

a transmit isolation transformer having a primary winding and a secondary winding;

a receive isolation transformer having a primary winding and a secondary winding;

a cable connection mechanism (a) electronically coupled to the secondary winding of the transmit transformer and connectable to a pair of lines of an outgoing twisted-pair cable so as to electronically couple the outgoing cable to the transmit transformer and (b) electronically coupled to the primary winding of the receive transformer and connectable to a pair of lines of an incoming twisted-pair cable so as to electronically couple the incoming cable to the receive transformer; and transceiver circuitry (a) for low-pass filtering digital data to produce first outgoing data which the transceiver circuitry differentially transmits to the primary winding of the transmit transformer largely at a first data transfer rate, (b) for differentially transmitting second outgoing data to the primary winding of the transmit transformer largely at a second data transfer rate different from the first data rate, the transceiver circuitry being operable to generate current-sourced data signals at each of the data rates and then to convert the current sourced signals into impedance-produced voltage signals that comprise the outgoing data, and (c) for differentially receiving incoming data from the secondary winding of the receive transformer largely at each of the data rates, incoming data from the secondary winding of the receive transformer being provided along data transfer paths that extend from the secondary winding of the receive transformer through where the transceiver circuitry physically receives incoming data at one of the data rates for substantive processing to where the transceiver circuitry physically receives incoming data at the other data rate for substantive processing, the data transfer paths having a characteristic impedance that is largely constant during normal apparatus operation.

38. Apparatus as in claim 37 wherein the second data rate is greater than the first data rate.

39. Apparatus as in claim 38 further including a transmit filter that low-pass filters the second outgoing data at a frequency bandwidth greater than that at which the first outgoing data is low-pass filtered in the transceiver circuitry.

40. Apparatus as in claim 39 wherein the transmit transformer is electronically coupled through the filter to the cable connection mechanism.

41. Apparatus as in claim 38 further including rate circuitry that determines whether outgoing or incoming data is to be transferred at the first data rate or at the second data rate and generates a corresponding data rate signal.

42. Apparatus as in claim 38 wherein incoming data from the secondary winding of the receive transformer is provided differentially during normal apparatus operation on a pair of second electrical conductors non-interruptibly coupled to the transceiver circuitry and to the secondary winding of the receive transformer.

43. Apparatus as in claim 38 wherein the first and second outgoing data are transmitted respectively in accordance with the 10Base-T and 100Base-TX protocols.

44. Apparatus as in claim 38 further including an optical transceiver coupled to the twisted-pair cables and to at least one optical cable.

* * * * *

UNITED STATES PATENT AND TRADEMARK OFFICE
CERTIFICATE OF CORRECTION

PATENT NO. : 5,896,417  Page 1 of 1
DATED : April 20, 1999
INVENTOR(S) : Lau, Hung-Wah A.

It is certified that error appears in the above-identified patent and that said Letters Patent is hereby corrected as shown below:

Column 4,
Line 12, delete "cur[]rent" and insert -- current --

Signed and Sealed this

Twenty-sixth Day of February, 2002

*Attest:*

*Attesting Officer*

JAMES E. ROGAN
*Director of the United States Patent and Trademark Office*